US011209597B2

(12) United States Patent
Fini et al.

(10) Patent No.: US 11,209,597 B2
(45) Date of Patent: Dec. 28, 2021

(54) SYSTEMS AND METHODS FOR COUPLING LIGHT INTO A MULTI-MODE RESONATOR

(71) Applicant: Ayar Labs, Inc., Santa Clara, CA (US)

(72) Inventors: John Fini, Oakland, CA (US); Derek Van Orden, San Francisco, CA (US); Mark Wade, Berkeley, CA (US)

(73) Assignee: Ayar Labs, Inc., Santa Clara, CA (US)

( * ) Notice: Subject to any disclaimer, the term of this patent is extended or adjusted under 35 U.S.C. 154(b) by 0 days.

(21) Appl. No.: 16/844,272

(22) Filed: Apr. 9, 2020

(65) Prior Publication Data

US 2020/0326480 A1    Oct. 15, 2020

Related U.S. Application Data

(60) Provisional application No. 62/832,270, filed on Apr. 10, 2019.

(51) Int. Cl.
*G02F 1/035*    (2006.01)
*G02B 6/293*   (2006.01)
*G02B 6/12*    (2006.01)

(52) U.S. Cl.
CPC ....... *G02B 6/2934* (2013.01); *G02B 6/12007* (2013.01)

(58) Field of Classification Search
CPC .......................... G02B 6/2934; G02B 6/12007
See application file for complete search history.

(56) References Cited

U.S. PATENT DOCUMENTS

| | | | |
|---|---|---|---|
| 6,389,203 B1 | 5/2002 | Jordan et al. | |
| 2002/0041730 A1 | 4/2002 | Sercel et al. | |
| 2008/0193133 A1 | 8/2008 | Krug et al. | |
| 2015/0316794 A1* | 11/2015 | Hayakawa | G02F 1/0121 385/2 |
| 2016/0238860 A1 | 8/2016 | Liang et al. | |
| 2018/0013512 A1* | 1/2018 | Akiyama | H04J 14/0221 |
| 2018/0062761 A1 | 3/2018 | Wade et al. | |
| 2018/0159293 A1* | 6/2018 | Bovington | G02F 1/0147 |

OTHER PUBLICATIONS

PCT/US20/27427, International Search Report, PCT/ISA/210, dated Jul. 16, 2020.
Little, B. E. et al., "Microring Resonator Channel Dropping Filters," Journal of Lightwave Technology, vol. 15, No. 6, 1997.
Bogaerts, W. et al., "Silicon Microring Resonators," Laser and Photonics Review 6, No. 1, pp. 47-73, 2012.

* cited by examiner

*Primary Examiner* — Ellen E Kim
(74) *Attorney, Agent, or Firm* — Penilla IP, APC

(57) ABSTRACT

A photonic system includes a passive optical cavity and an optical waveguide. The passive optical cavity has a preferred radial mode for light propagation within the passive optical cavity. The preferred radial mode has a unique light propagation constant within the passive optical cavity. The optical waveguide is configured to extend past the passive optical cavity such that at least some light propagating through the optical waveguide will evanescently couple into the passive optical cavity. The passive optical cavity and the optical waveguide are collectively configured such that a light propagation constant of the optical waveguide substantially matches the unique light propagation constant of the preferred radial mode within the passive optical cavity.

21 Claims, 9 Drawing Sheets

View (A-A)

View (A-A)

View (B-B)

View (B-B)

View (C-C)

View (C-C)

SYSTEMS AND METHODS FOR COUPLING LIGHT INTO A MULTI-MODE RESONATOR

CLAIM OF PRIORITY

This application claims priority under 35 U.S.C. 119(e) to U.S. Provisional Patent Application No. 62/832,270, filed Apr. 10, 2019, the disclosure of which is incorporated herein by reference in its entirety for all purposes.

BACKGROUND

Optical data communication systems operate by modulating laser light to encode digital data patterns. The laser light is coupled into optical waveguides as part of the modulation process. The modulated laser light is transmitted through an optical data network from a sending node to a receiving node. The modulated laser light having arrived at the receiving node is de-modulated to obtain the original digital data patterns. The modulated laser light is coupled into optical waveguides as part of the de-modulation process. Therefore, implementation and operation of optical data communication systems is dependent upon having reliable and efficient mechanisms for coupling light, either continuous wave light or modulated light) into one or more optical waveguides at a given node. Also, it is desirable for the light coupling mechanisms to have a minimal form factor and be designed as efficiently as possible. It is within this context that the present invention arises.

SUMMARY

In an example embodiment, a photonic system is disclosed. The photonic system includes a passive optical cavity having a preferred radial mode for light propagation within the passive optical cavity. The preferred radial mode has a unique light propagation constant within the passive optical cavity. The photonic system also includes an optical waveguide configured to extend past the passive optical cavity, such that at least some light propagating through the optical waveguide will evanescently couple into the passive optical cavity. The passive optical cavity and the optical waveguide are collectively configured such that a light propagation constant of the optical waveguide substantially matches the unique light propagation constant of the preferred radial mode within the passive optical cavity.

In an example embodiment, a photonic system is disclosed. The photonic system includes a ring resonator having a passive optical cavity that has a circuitous configuration. The passive optical cavity has an outer wall, a top surface, and a bottom surface. The passive optical cavity has a curved portion. The outer wall of the curved portion has a first radius of curvature. The ring resonator is configured to support multiple radial modes of light propagation within the passive optical cavity. The passive optical cavity has a preferred radial segment through which a preferred radial mode of light propagates within the passive optical cavity. The preferred radial segment has a first light propagation constant. The photonic system also includes an optical waveguide configured to extend past the passive optical cavity of the ring resonator. The optical waveguide has an outer wall farthest from the passive optical cavity of the ring resonator. The optical waveguide has an inner wall closest to the passive optical cavity of the ring resonator. The optical waveguide has a top surface and a bottom surface. The optical waveguide has a substantially constant width as measured substantially perpendicularly between the inner wall and the outer wall of the optical waveguide. The optical waveguide has a curved portion that is proximate to the curved portion of the passive optical cavity of the ring resonator. The curved portion of the optical waveguide has a second radius of curvature, such that the curved portion of the optical waveguide curves around the curved portion of the passive optical cavity of the ring resonator. The optical waveguide has a second light propagation constant. The optical waveguide and the passive optical cavity of the ring resonator are collectively configured so that the second light propagation constant of the optical waveguide is substantially equal to the first light propagation constant of the preferred radial segment of the passive optical cavity of the ring resonator.

In an example embodiment, a photonic system is disclosed. The photonic system includes a passive optical cavity having an annular shape. The passive optical cavity has an outer wall defined by an outer radius and an inner wall defined by an inner radius. The passive optical cavity has a substantially constant width measured substantially perpendicularly between the inner wall and the outer wall of the passive optical cavity. The passive optical cavity has a preferred radial segment through which a preferred radial mode of light propagates within the passive optical cavity. The preferred radial segment has a first light propagation constant. The photonic system also includes an optical waveguide having a first wall and a second wall. The optical cavity has a width measured substantially perpendicularly between the first wall and the second wall. The optical waveguide has a curved portion configured to curve around a portion of the passive optical cavity. The optical waveguide is positioned relative to the passive optical cavity such that a coupling gap distance exists between at least some location along the curved portion of the optical waveguide and the outer wall of the passive optical cavity. The optical waveguide has a second light propagation constant. The optical waveguide and the passive optical cavity are collectively configured so that the second light propagation constant of the optical waveguide is substantially equal to the first light propagation constant of the preferred radial segment of the passive optical cavity.

In an example embodiment, a method for manufacturing a photonic system is disclosed. The method includes forming a passive optical cavity to have a circuitous configuration such that light propagates around the passive optical cavity. The passive optical cavity is formed to have a preferred radial mode for light propagation within the passive optical cavity. The preferred radial mode has a unique light propagation constant within the passive optical cavity. The method also includes forming an optical waveguide to extend past the passive optical cavity, such that at least some light propagating through the optical waveguide will evanescently couple into the passive optical cavity. The passive optical cavity and the optical waveguide are collectively formed such that a light propagation constant of the optical waveguide substantially matches the unique light propagation constant of the preferred radial mode within the passive optical cavity.

DETAILED DESCRIPTION

In the following description, numerous specific details are set forth in order to provide an understanding of the present invention. It will be apparent, however, to one skilled in the art that the present invention may be practiced without some or all of these specific details. In other instances, well known process operations have not been described in detail in order not to unnecessarily obscure the present invention.

Optical cavities are used in a variety of applications in optical data communications systems, including in applications such as lasers, optical modulators, optical splitters, optical routers, optical switches, and optical detectors. Optical cavities may show strong wavelength selectivity, and are frequently used in systems that rely on multiple optical signals transmitting information at different wavelengths. Ring/disk resonator devices, in particular, enable configurations in which light that is coupled from an input optical waveguide into the optical cavity of the ring/disk resonator device can be efficiently routed to a separate output optical waveguide, or else absorbed within the ring/disk resonator device, at specific wavelengths. Ring/disk resonator devices may also be used in sensing applications, such as biological or chemical sensing, where a high concentration of optical power in a small area is needed.

It should be understood that the term "wavelength" as used herein refers to the wavelength of electromagnetic radiation. And, the term "light" as used herein refers to electromagnetic radiation within a portion of the electromagnetic spectrum that is usable by optical data communication systems. In some embodiments, the portion of the electromagnetic spectrum includes light having wavelengths within a range extending from about 1100 nanometers to about 1565 nanometers (covering from the O-Band to the C-Band, inclusively, of the electromagnetic spectrum). However, it should be understood that the portion of the electromagnetic spectrum as referred to herein can include light having wavelengths either less than 1100 nanometers or greater than 1565 nanometers, so long as the light is usable by an optical data communication system for encoding, transmission, and decoding of digital data through modulation/de-modulation of the light. In some embodiments, the light used in optical data communication systems has wavelengths in the near-infrared portion of the electromagnetic spectrum. It should be understood that light may be confined to propagate in an optical waveguide, such as (but not limited to) an optical fiber or an optical waveguide within a planar lightwave circuit (PLC). In some embodiments, the light can be polarized. And, in some embodiments, the light has a single wavelength, where the single wavelength can refer to either essentially one wavelength or can refer to a narrow band of wavelengths that can be identified and processed by an optical data communication system as if it were a single wavelength.

Figure 1A:
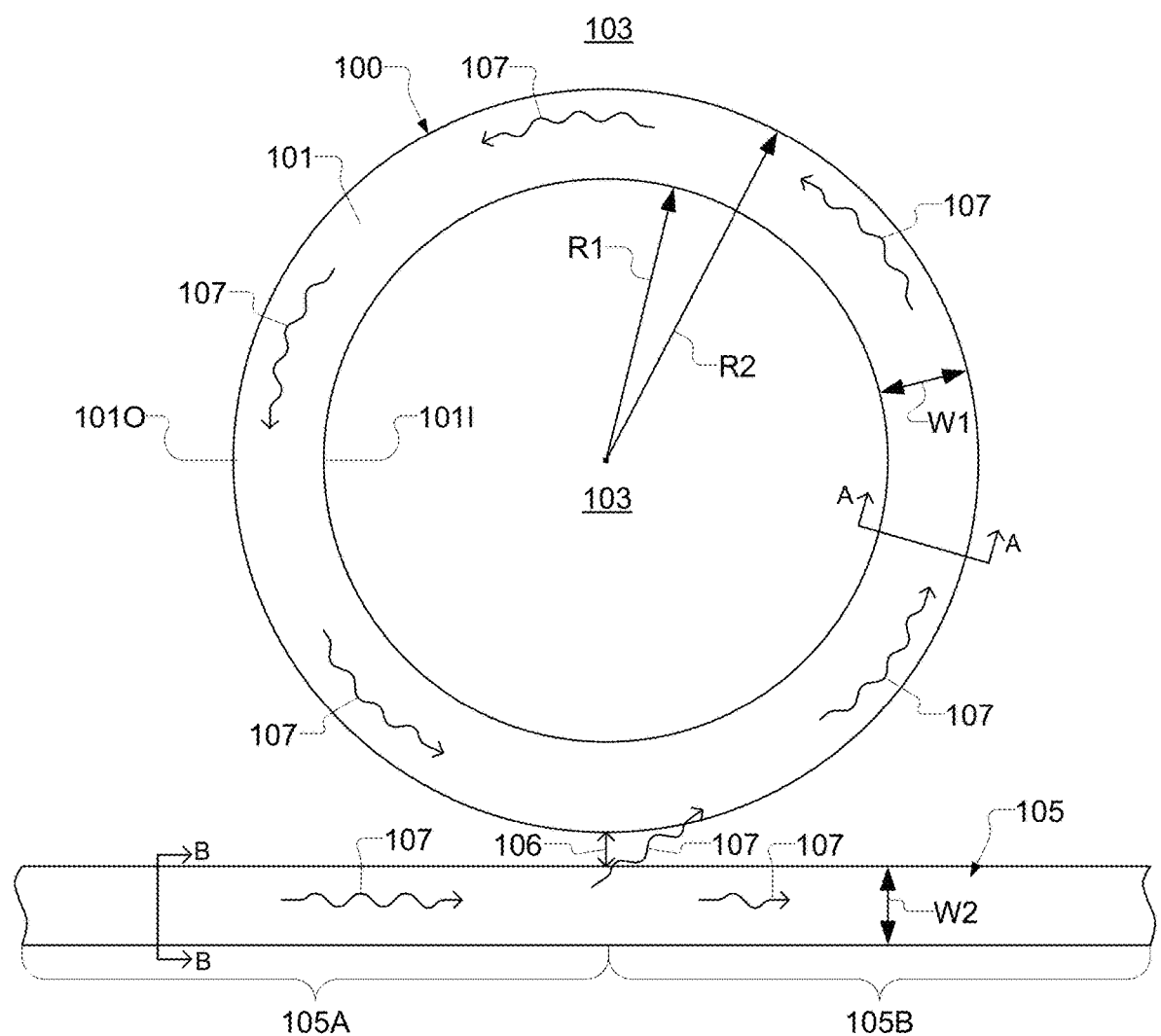
FIG. 1A shows a horizontal cross-section view of an example ring resonator device positioned next to an optical waveguide, in accordance with some embodiments.

FIG. 1A shows a horizontal cross-section view of an example ring resonator device 100 positioned next to an optical waveguide 105, in accordance with some embodiments. The ring resonator device 100 includes a passive optical cavity 101 having a circuitous configuration that loops back into itself. In the example of FIG. 1A, the passive optical cavity 101 has a substantially annular shape, e.g., a ring shape, defined by an inner wall surface 101I and an outer wall surface 101O. In various embodiments, the passive optical cavity of the ring resonator device can have a substantially circular shape or an oval shape. In some embodiments, the passive optical cavity of the ring resonator device can follow an arbitrary curved path. In some embodiments, the passive optical cavity of the ring resonator device can have a "race track" configuration, in which the passive optical cavity has two parallel and substantially straight sections that are connected by curved or semi-circular-shaped sections.

In the example of FIG. 1A, the passive optical cavity 101 having the annular shape is configured to have an inner radius R1, an outer radius R2, and a width W1, where W1=R2−R1. The optical waveguide 105 is configured to have a substantially rectangular/linear shape having a width W2. The optical waveguide 105 extends past the outer wall surface 101O of the passive optical cavity 101 of the ring resonator device 100. A distance 106 is a closest distance between the optical waveguide 105 and the outer wall surface 101O of the passive optical cavity 101 of the ring resonator device 100.

In various embodiments, the ring resonator device 100 can be used to perform optical modulation, optical detection, opto-mechanical transduction, chemical and/or biological sensing, among other operations, by way of example. In an alternative embodiment where in the ring resonator device 100 is defined as a disk resonator device, the passive optical cavity 101 is defined as a disk-shaped optical cavity. In various embodiments, the disk-shaped optical cavity can have a substantially circular shape or an oval shape. The example embodiments disclosed herein are described with regard to ring resonator devices, such as the ring resonator device 100. However, it should be understood that any of the embodiments disclosed herein can be alternatively and equivalently implemented using a disk resonator device in place of the ring resonator device 100, where the disk resonator device has a disk-shaped passive optical cavity instead of the ring-shaped passive optical cavity 101 of the ring resonator device 100.

In various implementations, light 107 can be evanescently coupled from the optical waveguide 105 into the passive optical cavity 101 of the ring resonator device 100. In various implementations, light 107 that is coupled into the passive optical cavity 101 of the ring resonator device 100 can be efficiently routed to a separate output optical waveguide or absorbed within the ring resonator device 100, at specific wavelengths. The optical waveguide 105 includes an input portion 105-1 and an output portion 105-2. Incoming light 107 travels through the input portion 105-1 of the optical waveguide 105 toward the ring resonator device 100. As the light 107 travels through the optical waveguide 105 near the ring resonator device 100, a portion of the light 107 will couple into the passive optical cavity 101 of the ring resonator device 100, and a remaining portion of the light 107 will travel on through the output portion 105-2 of the optical waveguide 105.

In the example embodiment of FIG. 1A, the optical waveguide 105 has a substantially linear configuration as it extends past the ring resonator device 100. However, in other embodiments the optical waveguide 105 can have a non-linear configuration, such that the optical waveguide 105 curves around a portion of the ring resonator device 100. In some embodiments, a portion of the optical waveguide 105 that curves around the portion of the ring resonator device 100 can have a radius of curvature similar to that of the passive optical cavity 101 of the ring resonator device 100. It should be understood that the optical waveguide 105 is configured (shaped, sized, and positioned) to enable coupling of light 107 that travels through the optical waveguide 105 into the passive optical cavity 101 of the ring resonator device 100 as the light travels through the optical waveguide 105 near the ring resonator device 100.

In various embodiments, the ring resonator device 100 and optical waveguide 105 can be implemented in essentially any material system in which an optical resonator device can be implemented, including by way of example, crystalline silicon surrounded by silicon dioxide cladding, or any number of dielectric materials that support reasonably high refractive index contrast and low propagation loss at optical and infrared frequencies. In some embodiments, each of the optical waveguide 105 and ring resonator device 100 is formed of a high refractive index material (e.g., crystalline silicon, among others) within a layer of a low refractive index material (e.g., silicon dioxide, among others). In some embodiments, each of the optical waveguide 105 and ring resonator device 100 is formed to have an opposite refractive polarity in which each of the optical waveguide 105 and ring resonator device 100 is defined by an absence of high refractive index material within a guiding layer of high refractive index material.

In various embodiments, the passive optical cavity 101 can be formed of monocrystalline silicon, polycrystalline silicon, amorphous silicon, silica, glass, silicon nitride (SiN, $Si_3N_4$), or III-V semiconductor material, among others, by way of example. In some embodiments, the passive optical cavity 101 can be formed by etching its structure from a layer of the material of which it is formed. However, it should be understood that in various embodiments the passive optical cavity 101 can be formed by essentially any suitable manufacturing technique or combination of techniques, of which etching is an example. Also, it should be understood that the passive optical cavity 101 is surrounded by a cladding material 103 that has a lower refractive index relative to the material of the passive optical cavity 101. In various embodiments, by way of example, the cladding material 103 can be silicon dioxide ($SiO_2$), silicon nitride ($Si_3N_4$), air, or another material having a suitably lower refractive index relative to whatever material is used for the passive optical cavity 101.

In some embodiments, a horizontal cross-section of the outer wall surface 101O of the passive optical cavity 101 is configured to have a substantially circular shape. In some embodiments, the radius R2 of the outer wall surface 101O of the passive optical cavity 101 is within a range extending from about 2000 nanometers (nm) to about 50000 nm. In some embodiments, the radius R2 of the outer wall surface 101O of the passive optical cavity 101 is about 5000 nm. It should be understood, however, that in some embodiments the radius R2 of the outer wall surface 101O of the passive optical cavity 101 can be less than 2000 nm or greater than 50000 nm. Also, in some embodiments, the passive optical cavity 101 may have a non-circular outer perimeter. For example, in some embodiments, the passive optical cavity 101 can have an oval-shaped outer perimeter. Also, in some embodiments, the passive optical cavity 101 can have a circuitous outer perimeter that is non-symmetric about a centerline of the ring resonator device 100.

Figure 1B:
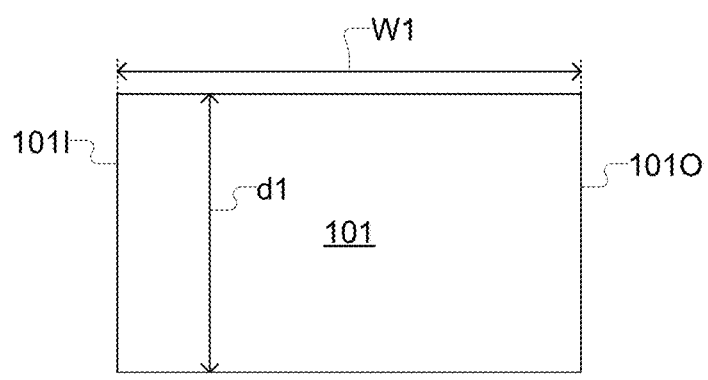
FIG. 1B shows a vertical cross-section view A-A of the passive optical cavity, as referenced in FIG. 1A, in accordance with some embodiments of the present invention.

FIG. 1B shows a vertical cross-section view A-A of the passive optical cavity 101, as referenced in FIG. 1A, in accordance with some embodiments of the present invention. In the example configuration of FIG. 1B, the passive optical cavity 101 has a substantially uniform vertical thickness d1. In some embodiments, the vertical thickness d1 is within a range extending from about 30 nm to about 300 nm. In some embodiments, the vertical thickness d1 is about 80 nm. It should be understood, however, that in other embodiments the vertical thickness d1 can be either less than 30 nm or greater than 300 nm. Also, in the example configuration of FIG. 1B, the passive optical cavity 101 has the radial width W1. In some embodiments, the radial width W1 is within a range extending from about 500 nm to about 3000 nm. In some embodiments, the radial width W1 is about 1200 nm. It should be understood, however, that in other embodiments the radial width W1 can be either less than 500 nm or greater than 3000 nm.

Figure 1C:
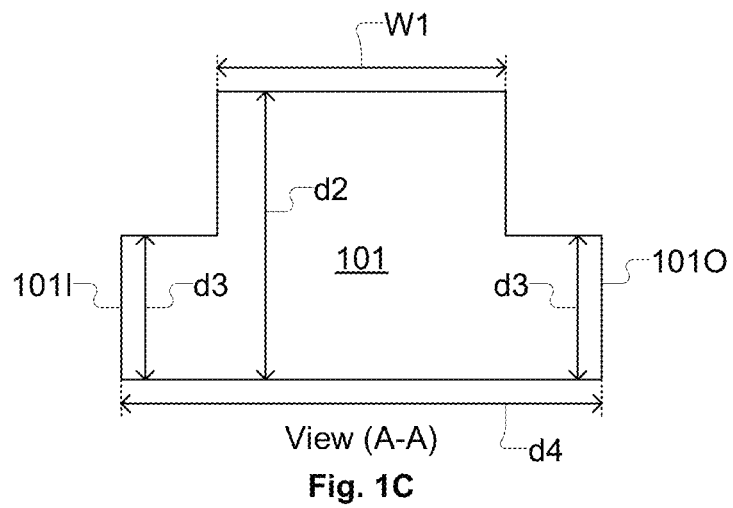
FIG. 1C shows another vertical cross-section view A-A of the passive optical cavity, as referenced in FIG. 1A, in accordance with some embodiments of the present invention.

FIG. 1C shows another vertical cross-section view A-A of the passive optical cavity 101, as referenced in FIG. 1A, in accordance with some embodiments of the present invention. In the example configuration of FIG. 1C, the passive optical cavity 101 has a stepped shape in which a central region of the passive optical cavity 101 has a vertical thickness d2 that is greater than a vertical thickness d3 of inner and outer portions of the passive optical cavity 101, formed inside and outside, respectively of the central region of the passive optical cavity 101. In some embodiments, the vertical thickness d2 is within a range extending from about 150 nm to about 300 nm. In some embodiments, the vertical thickness d2 is about 200 nm. It should be understood, however, that in other embodiments the vertical thickness d2 can be either less than 150 nm or greater than 300 nm. In some embodiments, the vertical thickness d3 is within a range extending from about 30 nm to about 150 nm. In some embodiments, the vertical thickness d3 is about 80 nm. It should be understood, however, that in other embodiments the vertical thickness d3 can be either less than 30 nm or greater than 150 nm. Also, in the example configuration of FIG. 1C, the central region of the passive optical cavity 101 has the radial width W1. In some embodiments, the radial width W1 is within a range extending from about 500 nm to about 3000 nm. In some embodiments, the radial width W1 is about 1200 nm. It should be understood, however, that in other embodiments the radial width W1 can be either less than 500 nm or greater than 3000 nm. Also, in the example configuration of FIG. 1C, the passive optical cavity 101 has an overall radial width d4. In some embodiments, the radial width d4 is within a range extending from about 500 nm to about 5000 nm. In some embodiments, the radial width d4 is about 3000 nm. It should be understood, however, that in other embodiments the radial width d4 can be either less than 500 nm or greater than 5000 nm. In some embodiments, the example configuration of FIG. 1C may be inverted vertically, such that the central region with vertical thickness d2 protrudes downwards, as opposed to upwards as is shown in FIG. 1C.

In some embodiments, the material composition and dimensions of the optical waveguide 105 are defined such that only desired optical modes of light couple into the passive optical cavity 101 of the ring resonator device 100. For example, in some embodiments, the optical waveguide 105 is configured such that coupling of light into the passive optical cavity 101 of the ring resonator device 100 is limited to a fundamental optical mode of the light. In various embodiments, the optical waveguide 105 can be formed of essentially any material through which light can be channeled from an entry location on the optical waveguide 105 to an exit location on the optical waveguide 105. For example, in various embodiments, the optical waveguide 105 can be formed of glass, silicon nitride (SiN), silicon dioxide ($SiO_2$), germanium-oxide ($GeO_2$), and/or silica, among other materials. In some embodiments, the optical waveguide 105 is configured to maintain a polarization of light as it travels through the optical waveguide 105.

Figure 1D:
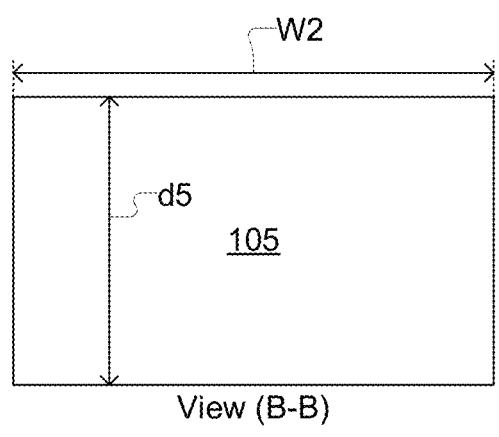
FIG. 1D shows a vertical cross-section view B-B of the optical waveguide, as referenced in FIG. 1A, in accordance with some embodiments of the present invention.

FIG. 1D shows a vertical cross-section view B-B of the optical waveguide 105, as referenced in FIG. 1A, in accordance with some embodiments of the present invention. In the example configuration of FIG. 1D, the optical waveguide 105 has a substantially uniform vertical thickness d5. In some embodiments, the vertical thickness d5 is within a range extending from about 30 nm to about 300 nm. In some embodiments, the vertical thickness d5 is about 80 nm. It should be understood, however, that in other embodiments the vertical thickness d5 can be either less than 30 nm or greater than 300 nm. Also, in the example configuration of FIG. 1D, the optical waveguide 105 has a width W2. In some embodiments, the width W2 is within a range extending from about 300 nm to about 1000 nm. In some embodiments, the width W2 is about 400 nm. It should be understood, however, that in other embodiments the width W2 can be either less than 300 nm or greater than 1000 nm.

Figure 1E:
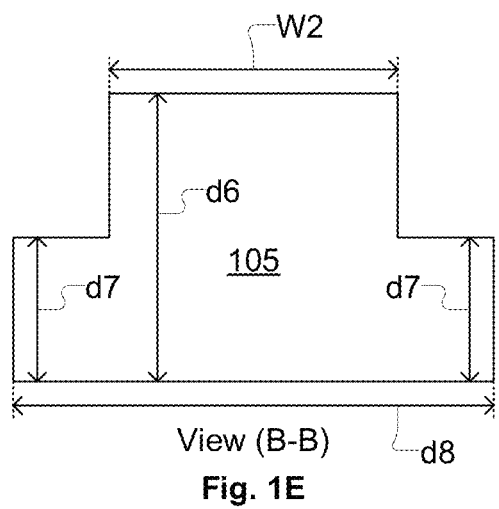
FIG. 1E shows another vertical cross-section view B-B of the optical waveguide, as referenced in FIG. 1A, in accordance with some embodiments of the present invention.

FIG. 1E shows another vertical cross-section view B-B of the optical waveguide 105, as referenced in FIG. 1A, in accordance with some embodiments of the present invention. In the example configuration of FIG. 1E, the optical waveguide 105 has a stepped shape in which a central region of the optical waveguide 105 has a vertical thickness d6 that is greater than a vertical thickness d7 of inner and outer portions of the optical waveguide 105, formed inside and outside, respectively of the central region of the optical waveguide 105. In some embodiments, the vertical thickness d7 is within a range extending from about 50 nm to about 150 nm. In some embodiments, the vertical thickness d7 is about 80 nm. It should be understood, however, that in other embodiments the vertical thickness d7 can be either less than 50 nm or greater than 150 nm. In some embodiments, the vertical thickness d6 is within a range extending from about 150 nm to about 300 nm. In some embodiments, the vertical thickness d6 is about 200 nm. It should be understood, however, that in other embodiments the vertical thickness d6 can be either less than 150 nm or greater than 300 nm. Also, in the example configuration of FIG. 1E, the central region of the optical waveguide 105 has the width W2. In some embodiments, the width W2 is within a range extending from about 200 nm to about 1000 nm. In some embodiments, the width W2 is about 400 nm. It should be understood, however, that in other embodiments the width W2 can be either less than 200 nm or greater than 1000 nm. Also, in the example configuration of FIG. 1E, the optical waveguide 105 has an overall width d8. In some embodiments, the width d8 is within a range extending from about 500 nm to about 3000 nm. In some embodiments, the width d8 is about 1200 nm. It should be understood, however, that in other embodiments the width d8 can be either less than 500 nm or greater than 3000 nm. In some embodiments, the example configuration of FIG. 1E may be inverted vertically, such that the central region with vertical thickness d8 protrudes downwards, as opposed to upwards as is shown in FIG. 1E.

For many applications, it is desirable for the passive optical cavity 101 of the ring resonator device 100 to have a large radial width W1 in order to reduce internal light loss. This is especially true for devices in which metal electrical contacts are placed on or near the inner wall surface 101I for thermal tuning or to contact diode junctions built into the ring resonator device 100. However, if the radial width W1 of the passive optical cavity 101 of the ring resonator device 100 is sufficiently large, the ring resonator device 100 will support multiple radial modes (or transverse modes) that have different resonant wavelengths and loss rates, which can complicate applications that require a single mode ring resonator device. Therefore, implementation of the ring resonator device 100 that has a larger radial width W1 depends on an ability to selectively couple light from an external optical waveguide, (e.g., the optical waveguide 105) into a preferred radial mode of the ring resonator device 100, and not into non-preferred radial modes of the ring resonator device 100.

Various embodiments are disclosed herein for a combination of optical resonator device (ring resonator device or disk resonator device) and external optical waveguide, in which light is evanescently coupled from the optical waveguide into a preferred radial mode of the optical resonator device and/or in which light is evanescently coupled from a preferred radial mode of the optical resonator device into the optical waveguide, without allowing for efficient coupling of light into/from non-preferred radial modes of the optical resonator device. The embodiments disclosed herein are particularly useful in applications that require a ring resonator device sized to support multiple radial modes, while also requiring selective excitation (evanescent coupling of light into/out of) of a single preferred radial mode within the ring resonator device. In the various embodiments disclosed herein, the external optical waveguide has a curved configuration along a light coupling region proximate to the optical resonator device to assist with evanescent coupling of light into and out of a preferred radial mode of optical resonator device, and to assist with ensuring non-efficient coupling of light into non-preferred radial mode(s) of the optical resonator device.

Figure 2A:
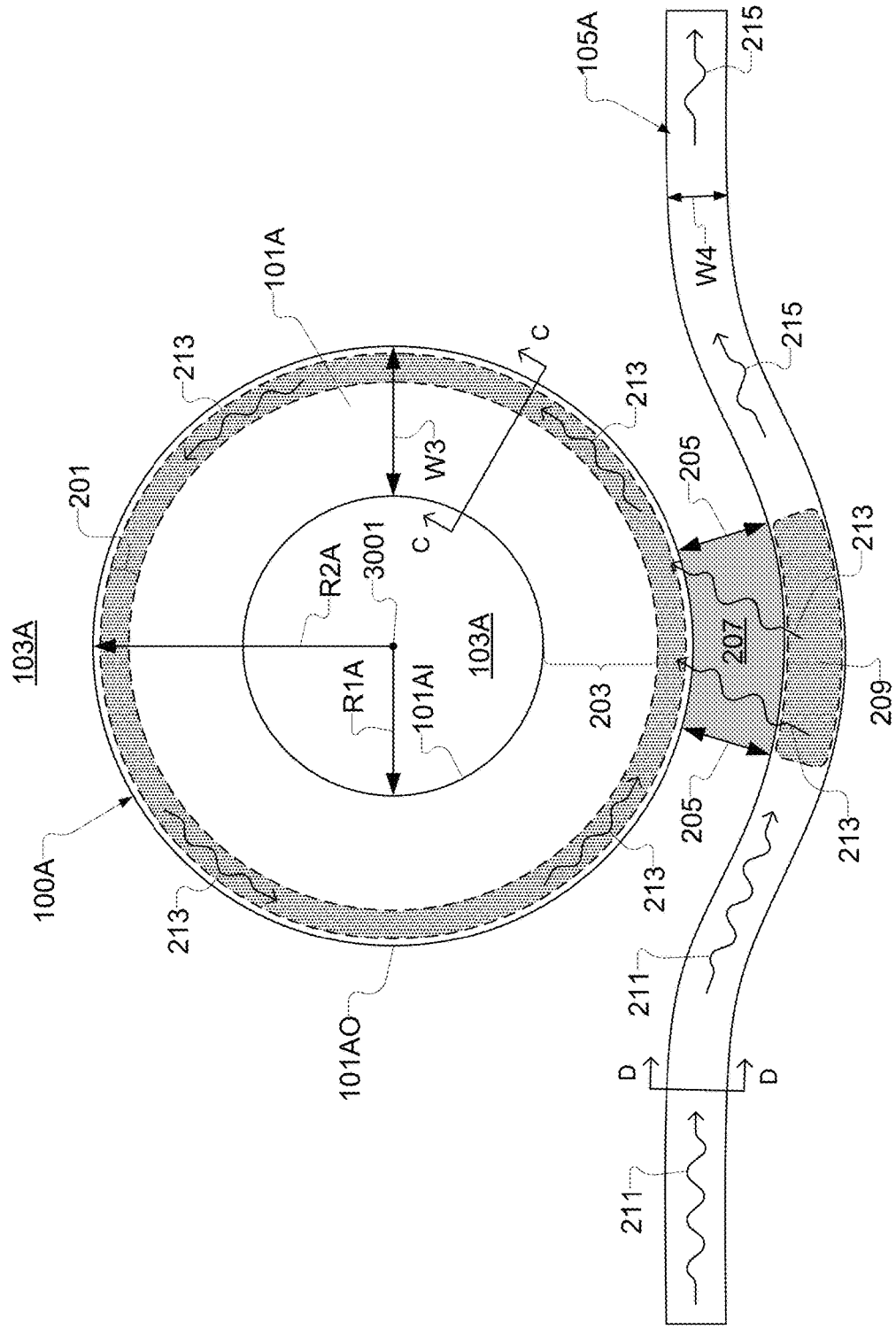
FIG. 2A shows a horizontal cross-section view of a ring resonator device positioned next to an optical waveguide, in accordance with some embodiments of the present invention.

FIG. 2A shows a horizontal cross-section view of a ring resonator device 100A positioned next to an optical waveguide 105A, in accordance with some embodiments of the present invention. The ring resonator device 100A includes a passive optical cavity 101A having a circuitous configuration that loops back into itself. More specifically, the passive optical cavity 101A has a substantially annular shape, e.g., a ring shape, defined by an inner wall surface 101AI and an outer wall surface 101AO. The passive optical cavity 101A has an inner radius R1A, an outer radius R2A, and a width W3, where W3=R2A−R1A. In some embodiments, the outer radius R2A of the outer wall surface 101AO of the passive optical cavity 101A is within a range extending from about 2000 nm to about 50000 nm. In some embodiments, the outer radius R2A of the outer wall surface 101AO of the passive optical cavity 101A is about 5000 nm. It should be understood, however, that in some embodiments the outer radius R2A of the outer wall surface 101AO of the passive optical cavity 101A can be less than 2000 nm or greater than 50000 nm.

Figure 2B:
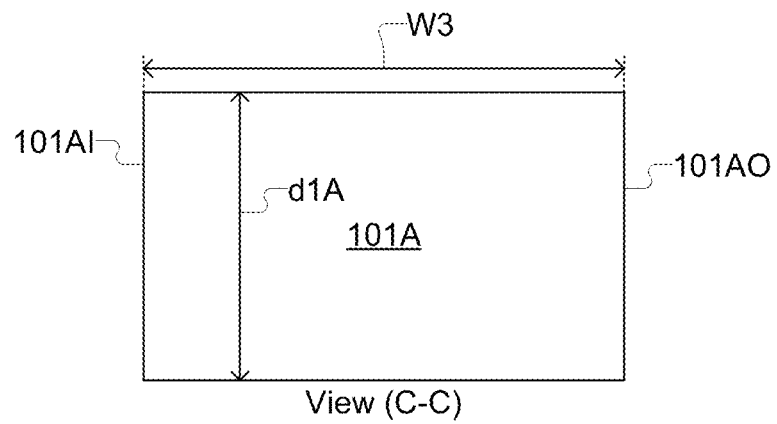
FIG. 2B shows a vertical cross-section view C-C of the passive optical cavity, as referenced in FIG. 2A, in accordance with some embodiments of the present invention.

FIG. 2B shows a vertical cross-section view C-C of the passive optical cavity 101A, as referenced in FIG. 2A, in accordance with some embodiments of the present invention. In the example configuration of FIG. 2B, the passive optical cavity 101A has a substantially uniform vertical thickness d1A. In some embodiments, the vertical thickness d1A is within a range extending from about 30 nm to about 300 nm. In some embodiments, the vertical thickness d1A is about 80 nm. It should be understood, however, that in other embodiments the vertical thickness d1A can be either less than 30 nm or greater than 300 nm. Also, in the example configuration of FIG. 2B, the passive optical cavity 101A has the radial width W3. In some embodiments, the radial width W3 is within a range extending from about 500 nm to about 3000 nm. In some embodiments, the radial width W3 is about 1200 nm. It should be understood, however, that in other embodiments the radial width W3 can be either less than 500 nm or greater than 3000 nm.

Figure 2C:
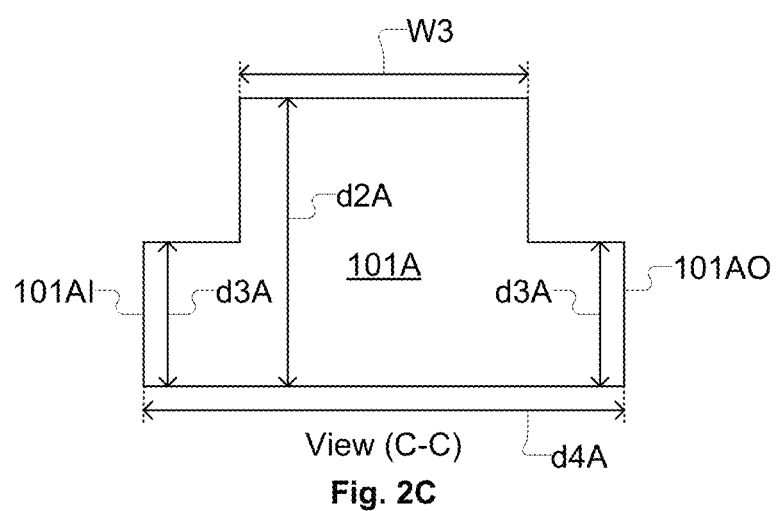
FIG. 2C shows another vertical cross-section view C-C of the passive optical cavity, as referenced in FIG. 2A, in accordance with some embodiments of the present invention.

FIG. 2C shows another vertical cross-section view C-C of the passive optical cavity 101A, as referenced in FIG. 2A, in accordance with some embodiments of the present invention. In the example configuration of FIG. 2C, the passive optical cavity 101A has a stepped shape in which a central region of the passive optical cavity 101A has a vertical thickness d2A that is greater than a vertical thickness d3A of inner and outer portions of the passive optical cavity 101A, formed inside and outside, respectively of the central region of the passive optical cavity 101A. In some embodiments, the vertical thickness d2A is within a range extending from about 150 nm to about 300 nm. In some embodiments, the vertical thickness d2A is about 200 nm. It should be understood, however, that in other embodiments the vertical thickness d2A can be either less than 150 nm or greater than 300 nm. In some embodiments, the vertical thickness d3A is within a range extending from about 30 nm to about 150 nm. In some embodiments, the vertical thickness d3A is about 80 nm. It should be understood, however, that in other embodiments the vertical thickness d3A can be either less than 30 nm or greater than 150 nm. Also, in the example configuration of FIG. 2C, the central region of the passive optical cavity 101A has the radial width W3. In some embodiments, the radial width W3 is within a range extending from about 500 nm to about 3000 nm. In some embodiments, the radial width W3 is about 1200 nm. It should be understood, however, that in other embodiments the radial width W3 can be either less than 500 nm or greater than 3000 nm. Also, in the example configuration of FIG. 2C, the passive optical cavity 101A has an overall radial width d4A. In some embodiments, the radial width d4A is within a range extending from about 500 nm to about 5000 nm. In some embodiments, the radial width d4A is about 3000 nm. It should be understood, however, that in other embodiments the radial width d4A can be either less than 200 nm or greater than 1000 nm. In some embodiments, the example configuration of FIG. 2C may be inverted vertically, such that the central region with vertical thickness d2A protrudes downwards, as opposed to upwards as is shown in FIG. 2C.

The optical waveguide 105A is configured and positioned to extend past the outer wall surface 101AO of the passive optical cavity 101A of the ring resonator device 100A. The optical waveguide 105A has a width W4. The optical waveguide 105A is separated from the outer wall surface 101AO of the passive optical cavity 101A by a substantially constant distance 205 along a light coupling region 207 between the optical waveguide 105A and the ring resonator device 100A. In this manner, a path of the optical waveguide 105A substantially matches a curvature of the passive optical cavity 101A of the ring resonator device 100A along the light coupling region 207, which facilitates high, consistent coupling of light between the optical waveguide 105A and the passive optical cavity 101A with minimal bend loss.

Figure 2D:
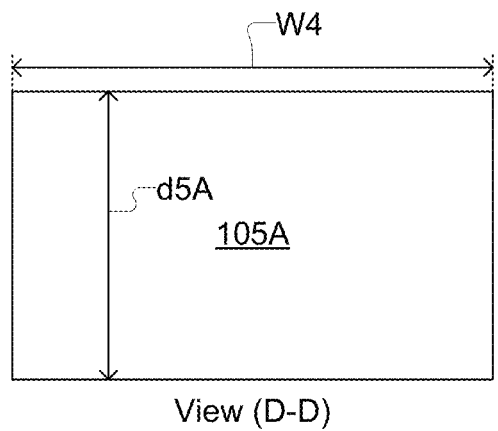
FIG. 2D shows a vertical cross-section view D-D of the optical waveguide, as referenced in FIG. 2A, in accordance with some embodiments of the present invention.

FIG. 2D shows a vertical cross-section view D-D of the optical waveguide 105A, as referenced in FIG. 2A, in accordance with some embodiments of the present invention. In the example configuration of FIG. 2D, the optical waveguide 105A has a substantially uniform vertical thickness d5A. In some embodiments, the vertical thickness d5A is within a range extending from about 30 nm to about 300 nm. In some embodiments, the vertical thickness d5A is about 80 nm. It should be understood, however, that in other embodiments the vertical thickness d5A can be either less than 30 nm or greater than 300 nm. Also, in the example configuration of FIG. 2D, the optical waveguide 105A has a width W4. In some embodiments, the width W4 is within a range extending from about 300 nm to about 1000 nm. In some embodiments, the width W4 is about 400 nm. It should be understood, however, that in other embodiments the width W4 can be either less than 300 nm or greater than 1000 nm.

Figure 2E:
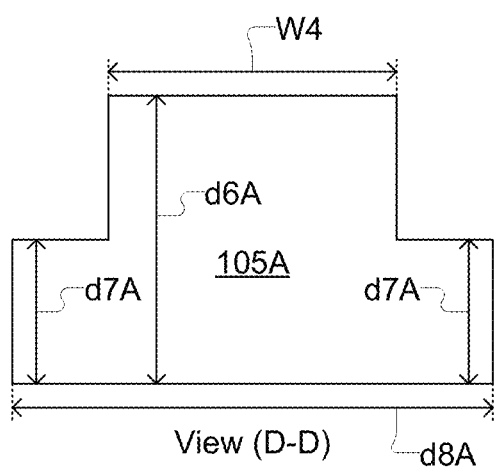
FIG. 2E shows another vertical cross-section view D-D of the optical waveguide, as referenced in FIG. 2A, in accordance with some embodiments of the present invention.

FIG. 2E shows another vertical cross-section view D-D of the optical waveguide 105A, as referenced in FIG. 2A, in accordance with some embodiments of the present invention. In the example configuration of FIG. 2E, the optical waveguide 105A has a stepped shape in which a central region of the optical waveguide 105A has a vertical thickness d6A that is greater than a vertical thickness d7A of inner and outer portions of the optical waveguide 105A, formed inside and outside, respectively of the central region of the optical waveguide 105A. In some embodiments, the vertical thickness d7A is within a range extending from about 30 nm to about 150 nm. In some embodiments, the vertical thickness d7A is about 80 nm. It should be understood, however, that in other embodiments the vertical thickness d7A can be either less than 30 nm or greater than 150 nm. In some embodiments, the vertical thickness d6A is within a range extending from about 150 nm to about 300 nm. In some embodiments, the vertical thickness d6A is about 200 nm. It should be understood, however, that in other embodiments the vertical thickness d6A can be either less than 150 nm or greater than 300 nm. Also, in the example configuration of FIG. 2E, the central region of the optical waveguide 105A has the width W4. In some embodiments, the width W4 is within a range extending from about 200 nm to about 1000 nm. In some embodiments, the width W4 is about 400 nm. It should be understood, however, that in other embodiments the width W4 can be either less than 200 nm or greater than 1000 nm. Also, in the example configuration of FIG. 2E, the optical waveguide 105A has an overall width d8A. In some embodiments, the width d8A is within a range extending from about 500 nm to about 3000 nm. In some embodiments, the width d8A is about 1200 nm. It should be understood, however, that in other embodiments the width d8A can be either less than 500 nm or greater than 3000 nm. In some embodiments, the example configuration of FIG. 2E may be inverted vertically, such that the central region with vertical thickness d8A protrudes downwards, as opposed to upwards as is shown in FIG. 2E.

In various embodiments, the ring resonator device 100A and optical waveguide 105A can be implemented in essentially any material system in which an optical resonator device can be implemented, including by way of example, silicon surrounded by silicon dioxide cladding, or any number of dielectric materials that support reasonably high refractive index contrast and low propagation loss at optical and infrared frequencies. In some embodiments, each of the optical waveguide 105A and ring resonator device 100A is formed of a high refractive index material (e.g., silicon, among others) within a layer of a low refractive index material (e.g., oxide, among others). In some embodiments, each of the optical waveguide 105A and ring resonator device 100A is formed to have an opposite refractive polarity in which each of the optical waveguide 105A and ring resonator device 100A is defined by an absence of high refractive index material within a guiding layer of high refractive index material.

In various embodiments, the passive optical cavity 101A can be formed of monocrystalline silicon, polycrystalline silicon, amorphous silicon, silica, glass, silicon nitride (SiN, Si3N4), or III-V semiconductor material, among others, by way of example. In some embodiments, the passive optical cavity 101A can be formed by etching its structure from a layer of the material of which it is formed. However, it should be understood that in various embodiments the passive optical cavity 101A can be formed by essentially any suitable manufacturing technique or combination of techniques, of which etching is an example. Also, it should be understood that the passive optical cavity 101A is surrounded by a cladding material 103A that has a lower refractive index relative to the material of the passive optical cavity 101A. In various embodiments, by way of example, the cladding material 103A can be $SiO_2$, $Si_3N_4$, air, or another material having a suitably lower refractive index relative to whatever material is used for the passive optical cavity 101A.

In various embodiments, the optical waveguide 105A can be formed of essentially any material through which light can be channeled from an entry location on the optical waveguide 105A to an exit location on the optical waveguide 105A. For example, in various embodiments, the optical waveguide 105A can be formed of glass, SiN, $SiO_2$, $GeO_2$, and/or silica, among other materials. In some embodiments, the optical waveguide 105A is configured to maintain a polarization of light as it travels through the optical waveguide 105A.

In various embodiments, the ring resonator device 100A can be used to perform optical modulation, optical detection, opto-mechanical transduction, chemical and/or biological sensing, among other operations, by way of example. When light 211 that travels through the optical waveguide 105A toward the ring resonator device 100A reaches a coupling segment 209 of the optical waveguide 105A, a portion of light 213 will evanescently couple from optical waveguide 105A through the light coupling region 207 into the passive optical cavity 101A. In some embodiments, the light 213 that couples into the passive optical cavity 101A through the light coupling region 207 can be essentially all of the incoming light 211. In some embodiments, the light 213 that couples into the passive optical cavity 101A through the light coupling region 207 can be less than all of the incoming light 211, with an amount of uncoupled light 215 passing through the coupling segment 209 and propagating on within the optical waveguide 105A. In various implementations, light 213 that is coupled into the passive optical cavity 101A of the ring resonator device 100A can be efficiently routed to a separate output optical waveguide or absorbed within the ring resonator device 100A, at specific wavelengths.

The evanescent coupling of light 213 from the optical waveguide 105A, through the light coupling region 207, to the passive optical cavity 101A, vice-versa, depends on several factors. One of these factors is the spatial overlap of energy (or electric field) between the mode of the optical waveguide 105A and the desired mode of the ring resonator device 100A. Another one of these factors is the difference in propagation constants (or the rate of spatial phase change) between the mode of the optical waveguide 105A and the desired mode of the ring resonator device 100A. And, another one of these factors is the effective length of the light coupling region 207 over which optical coupling occurs between the optical waveguide 105A and passive optical cavity 101A of the ring resonator device 100A.

The ring resonator device 100A can support multiple radial modes when the width W3 is sufficiently large. For a disk resonator device similar to the ring resonator device 100A, the inner radius R1A is not present, i.e., R1A=0. In other words, the passive optical cavity of the disk resonator device extends to the centerpoint of the passive optical cavity. It is assumed that a disk resonator device supports multiple radial modes at all operational light wavelengths of interest. In some embodiments, the ring resonator device 100A is configured to operate with a single polarization of light. The term "radial modes," as used with regard to the ring resonator device 100A, indicates the modes in the preferred polarization of light for the ring resonator device 100A configuration. Therefore, if the width W3 is set sufficiently small so that the ring resonator device 100A supports a single TE mode and a single TM mode, the ring resonator device 100A is not described as supporting multiple modes. However, if the width W3 is set sufficiently large so that the ring resonator device 100A supports multiple TE modes and multiple TM modes, the ring resonator device 100A is described as supporting multiple modes.

An example metric used to indicate if the ring resonator device 100A supports multiple radial modes is the ratio of the width W3 of the passive optical cavity 101A to the width W4 of the optical waveguide 105A, i.e., (W3/W4). In some embodiments, the width W4 of the optical waveguide 105A is set to support a single transverse mode in the light polarization of interest (transverse electric (TE) or transverse magnetic (TM)). When the width W3 of the passive optical cavity 101A of the ring resonator device 100A is at least twice the width W4 of the optical waveguide 105A, i.e., when (W3/W4) is greater than or equal to two, the ring resonator device 100A is likely to support multiple radial modes.

Another example metric used to indicate if the ring resonator device 100A supports multiple radial modes is shown in Equation 1, where W3 is the width of the passive optical cavity 101A of the ring resonator device 100A, $n_{core}$ is the refractive index of the material of the passive optical cavity 101A, $n_{clad}$ is the refractive index of the cladding material 103A, and (λ) is the wavelength of the light 213 that couples into the passive optical cavity 101A from the optical waveguide 105A. If the width W3 of the passive optical cavity 101A of the ring resonator device 100A satisfies the expression of Equation 1, the ring resonator device 100A is likely to support multiple radial modes. For example, if the passive optical cavity 101A is formed of silicon and the cladding material is formed of silicon dioxide, Equation 1 reduces to [W3>(0.32*λ)]. It should be understood that the expression of Equation 1 is approximate. More specifically, some values of W3 that satisfy Equation 1 will result in the ring resonator device 100A having a single radial mode. However, almost all multiple radial mode configurations of the ring resonator device 100A will satisfy Equation 1.

$$w > \frac{\lambda}{\sqrt{n_{core}^2 - n_{clad}^2}}.$$  Equation 1

In various embodiments, the light wavelength range of operation for the ring resonator device 100A can extend from the visible spectrum (100's of nanometers) to the infrared portion of the electromagnetic spectrum (a few micrometers). The size of the ring resonator device 100A scales roughly with the light wavelength and inversely to material refractive indices. Therefore, in various embodiments, the dimensions (R1A, R2A, W3) of the ring resonator device 100A can span a wide range. In some embodiments, the width W4 of the optical waveguide 105A can be as small as 150 nm for smaller light wavelengths in high refractive index contrast material systems. In some embodiments, the width W4 of the optical waveguide 105A can be as high as 3 micrometers for larger light wavelengths or in low refractive index contrast material systems, such as glass. In various embodiments, the width W3 of the passive optical cavity 101A of the ring resonator device 100A ranges from about twice the width W4 of the optical waveguide 105A to many times the width W4 of the optical waveguide 105A, up to a limit where the ring resonator device 100A becomes a disk resonator device, i.e., up to the limit where R1A=0. In various embodiments, the outer radius R2A of the passive optical cavity 101A of the ring resonator device 100A is within a range extending from about 1 micrometer to about 10 millimeters.

In various embodiments, the vertical thickness of the optical waveguide 105A (measured in the direction out of the page in FIG. 2A) is within a range extending from about one-tenth the width W4 of the optical waveguide 105A to about three times the width W4 of the optical waveguide 105A. In various embodiments, the vertical thickness of the passive optical cavity 101A of the ring resonator device 100A (measured in the direction out of the page in FIG. 2A) is within a range extending from about one-tenth the width W4 of the optical waveguide 105A to about three times the width W4 of the optical waveguide 105A. In various embodiments, the vertical thickness of the passive optical cavity 101A of the ring resonator device 100A (measured in the direction out of the page in FIG. 2A) is set to be about the same as the vertical thickness of the optical waveguide 105A. In some embodiments, fabrication considerations may require the vertical thickness of the passive optical cavity 101A to be about equal to the vertical thickness of the optical waveguide 105A. In some embodiments, the distance 205 along the light coupling region 207 between the optical waveguide 105A and the ring resonator device 100A (the coupling gap) is less than the free-space wavelength, and may be as small as can be reasonably manufactured. In some embodiments, the distance 205 is not less than about 20 nanometers.

In some example embodiments, the passive optical cavity 101A of the ring resonator device 100A is formed of a semiconductor material, such as crystalline silicon, and the cladding material 103A that surrounds the passive optical cavity 101A is formed of an oxide material, such as silicon dioxide. In these embodiments, an operational light wavelength of the ring resonator device 100A is typically in the infrared portion of the electromagnetic spectrum. In some embodiments, the operational light wavelength of the ring resonator device 100A is within a range extending from about 1 micrometer to about 2 micrometers. In some embodiments, the operational light wavelength of the ring resonator device 100A is within a range extending from about 1260 nanometers to about 1310 nanometers.

Also, in these embodiments, the width W4 of the optical waveguide 105A is within a range extending from about 250 nanometers to about 650 nanometers. In some embodiments, the width W4 of the optical waveguide 105A is about 400 nanometers. In some embodiments, the width W3 of the passive optical cavity 101A of the ring resonator device 100A is greater than or equal to twice the width W4 of the optical waveguide 105A. In some embodiments, the width W3 of the passive optical cavity 101A of the ring resonator device 100A is about 1200 nanometers. Also, in these embodiments, the vertical thickness of the passive optical cavity 101A and of the optical waveguide 105A is within a range extending from about 30 nanometers to about 500 nanometers. In some embodiments, the vertical thickness of each of the passive optical cavity 101A and of the optical waveguide 105A is 75 nanometers.

Also, in these embodiments, the outer radius R2A of the passive optical cavity 101A is within a range extending from about 2 micrometers to about 50 micrometers. Also, in these embodiments, the distance 205 between the optical waveguide 105A and the ring resonator device 100A along the light coupling region 207 (the coupling gap distance) is within a range extending from about 50 nanometers to about 1 micrometer. In some embodiments, the distance 205 along the light coupling region 207 between the optical waveguide 105A and the ring resonator device 100A (the coupling gap) is within a range extending from about 100 nanometers to about 500 nanometers.

With the ring resonator device 100A configured to support multiple radial modes, each radial mode has a distinct propagation constant in the azimuthal direction as measured in the horizontal plane about the center of the passive optical cavity 101A (or as measured tangential to the outer wall surface 101AO of the passive optical cavity 101A). For example, FIG. 2A shows the passive optical cavity 101A supporting a fundamental radial mode within a radial segment 201 that extends azimuthally about the center of the passive optical cavity 101A. FIG. 2A also shows the passive optical cavity 101A supporting other higher order radial modes in a radial segment 203 that extends azimuthally about the center of the passive optical cavity 101A inside of the radial segment 201. The radial segment 201 that supports the fundamental radial mode is usually an outer radial segment of the passive optical cavity 101A. The different radial modes generally resonate at different wavelengths. Also, different radial modes have different propagation loss rates, which leads to different quality factors for the ring resonator device 100A and different cavity linewidths for the passive optical cavity 101A.

In many applications that implement the ring resonator device 100A, coupling to only one radial mode of the ring resonator device 100A is desired, and any coupling to other radial modes of the ring resonator device 100A is avoided, because coupling to other radial modes of the ring resonator device 100A can result in signal loss and/or undesired crosstalk between different optical data communication channels. In various embodiments, the ring resonator device 100A and the optical waveguide 105A are collectively configured so that the propagation constant of the optical waveguide 105A substantially matches the propagation constant of the preferred radial mode within the passive optical cavity 101A of the ring resonator device 100A along the light coupling region 207 between the optical waveguide 105A and the ring resonator device 100A where the light 213 strongly couples from the optical waveguide 105A into the passive optical cavity 101A, or vice-versa. For example, in FIG. 2A, the ring resonator device 100A and the optical waveguide 105A are collectively configured so that the propagation constant of the optical waveguide 105A along the light coupling region 207 substantially matches the propagation constant of the radial segment 201 within the passive optical cavity 101A that supports the fundamental radial mode along the light coupling region 207. In various embodiments, the material compositions and dimensions of the optical waveguide 105A and/or the passive optical cavity 101A are defined such that only desired optical modes of light couple from the optical waveguide 105A into the passive optical cavity 101A, or vice-versa. For example, in some embodiments such as depicted in FIG. 2A, the optical waveguide 105A and the passive optical cavity 101A are collectively configured such that the light 213 that couples from the optical waveguide 105A into the passive optical cavity 101A is limited to the fundamental optical mode of the incoming light 211.

In the example embodiments of FIG. 2A, the optical waveguide 105A is configured to curve around the passive optical cavity 101A of the ring resonator device 100A along the light coupling region 207 so that the light propagation direction in the radial segment 201 that supports the preferred radial mode within the passive optical cavity 101A is substantially parallel with the light propagation direction through the optical waveguide 105A along the light coupling region 207. The radius of curvature of the optical waveguide 105A along the light coupling region 207 can be measured from and about the center of the passive optical cavity 101A, i.e., can be measured from and about the same location that the outer radius R2A and the inner radius R1A of the passive optical cavity 101A are measured. The radius of curvature of the optical waveguide 105A along the light coupling region 207 has an effect on the propagation constant of the optical waveguide 105A along the light coupling region 207. Also, the propagation constant of the optical waveguide 105A along the light coupling region 207 can be controlled through one or more of the refractive index of the optical waveguide 105A material, the width W4 of the optical waveguide 105A, and the refractive index of the cladding material 103A. Also, the propagation constant of the radial segment 201 that supports the fundamental radial mode within the passive optical cavity 101A along the light coupling region 207 can be controlled through one or more of the refractive index of the passive optical cavity 101A material, the outer radius R2A of the passive optical cavity 101A, and the refractive index of the cladding material 103A. Therefore, substantial matching of the propagation constants of the passive optical cavity 101A and the optical waveguide 105A along the light coupling region 207 is achieved through control of the geometric dimensions of the passive optical cavity 101A and the optical waveguide 105A, and through control of the refractive indexes of the passive optical cavity 101A, the optical waveguide 105A, and the cladding material 103A. In this manner, in the example of FIG. 2A, the propagation constant of the optical waveguide 105A along the light coupling region 207 is closely matched with the propagation constant of the preferred radial mode within the passive optical cavity 101A to facilitate efficient energy transfer of light 213 into the preferred radial mode of the ring resonator device 100A, while at the same time the propagation constant of the optical waveguide 105A along the light coupling region 207 is sufficiently mismatched with the propagation constant(s) of the non-preferred radial mode(s) within the passive optical cavity 101A to prevent unwanted coupling of light 211 from the optical waveguide 105A into the passive optical cavity 101A.

Figure 3:
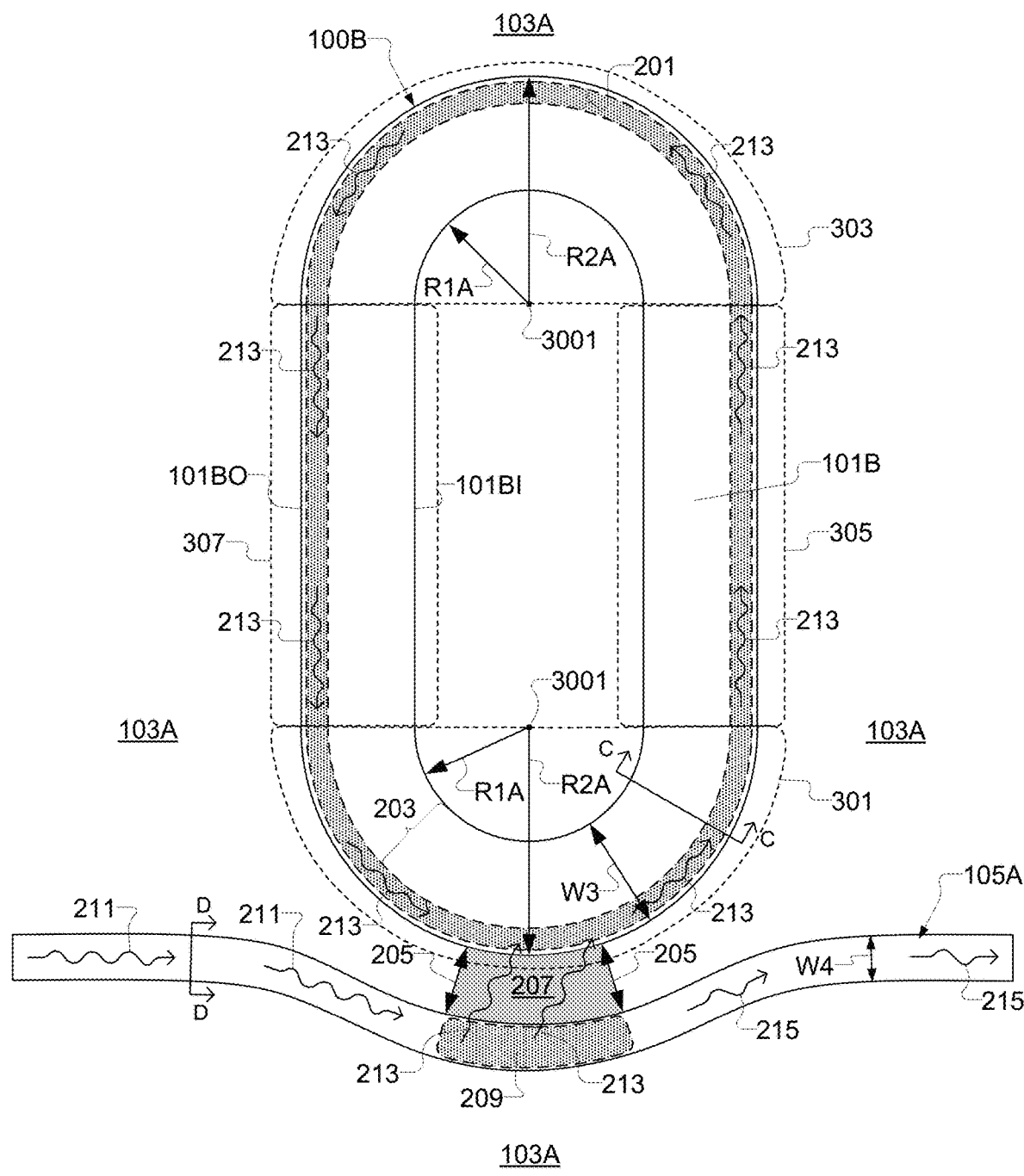
FIG. 3 shows a horizontal cross-section view of a race track-shaped ring resonator device positioned next to the optical waveguide, in accordance with some embodiments of the present invention.

In some embodiments, the substantial matching of the propagation constant of the optical waveguide 105A along the light coupling region 207 with the propagation constant of the preferred radial mode of the ring resonator device 100A can be achieved even when the ring resonator device 100A is modified to have a non-annular shape. For example, FIG. 3 shows a horizontal cross-section view of a race track-shaped ring resonator device 100B positioned next to the optical waveguide 105A, in accordance with some embodiments of the present invention. The ring resonator device 100B includes a passive optical cavity 101B having an inner surface 101BI and an outer surface 101BO. The passive optical cavity 101B has a race track shape defined by a first curved section 301 that is connected to a second curved section 303 by two linear-shaped sections 305 and 307. The first curved section 301 is shaped equivalent to half of the passive optical cavity 101A of the ring resonator device 100A that is closest to the optical waveguide 105A in the example of FIG. 2A. Therefore, the optical waveguide 105A and the first curved section 301 of the passive optical cavity 101B are optically coupled over the light coupling region 207 in the same manner as discussed with regard to the optical waveguide 105A and the passive optical cavity 101A of FIG. 2A. Also, as with the combination of the ring resonator device 100A and the optical waveguide 105A of FIG. 2A, the propagation constants of the optical waveguide 105A and the passive optical cavity 101B over the light coupling region 207 are substantially matched through control of the geometric dimensions of the passive optical cavity 101B and the optical waveguide 105A, and through control of the refractive indexes of the passive optical cavity 101B, the optical waveguide 105A, and the cladding material 103A. In this manner, in the example of FIG. 3, the propagation constant of the optical waveguide 105A along the light coupling region 207 is closely matched with the propagation constant of the preferred radial mode within the passive optical cavity 101B to facilitate efficient energy transfer of light 213 into the preferred radial mode of the ring resonator device 100B, while at the same time the propagation constant of the optical waveguide 105A along the light coupling region 207 is sufficiently mismatched with the propagation constant(s) of the non-preferred radial mode(s) within the passive optical cavity 101B to prevent unwanted coupling of light 211 (e.g., coupling of light into non-preferred radial mode(s)) from the optical waveguide 105A into the passive optical cavity 101B. In various embodiments, the passive optical cavity 101B of the ring resonator device 100B can have a vertical cross-section configuration equivalent to either of the vertical cross-section configurations described for the passive optical cavity 101A of the ring resonator device 100A with the regard to FIGS. 2B and 2C.

Figure 4:
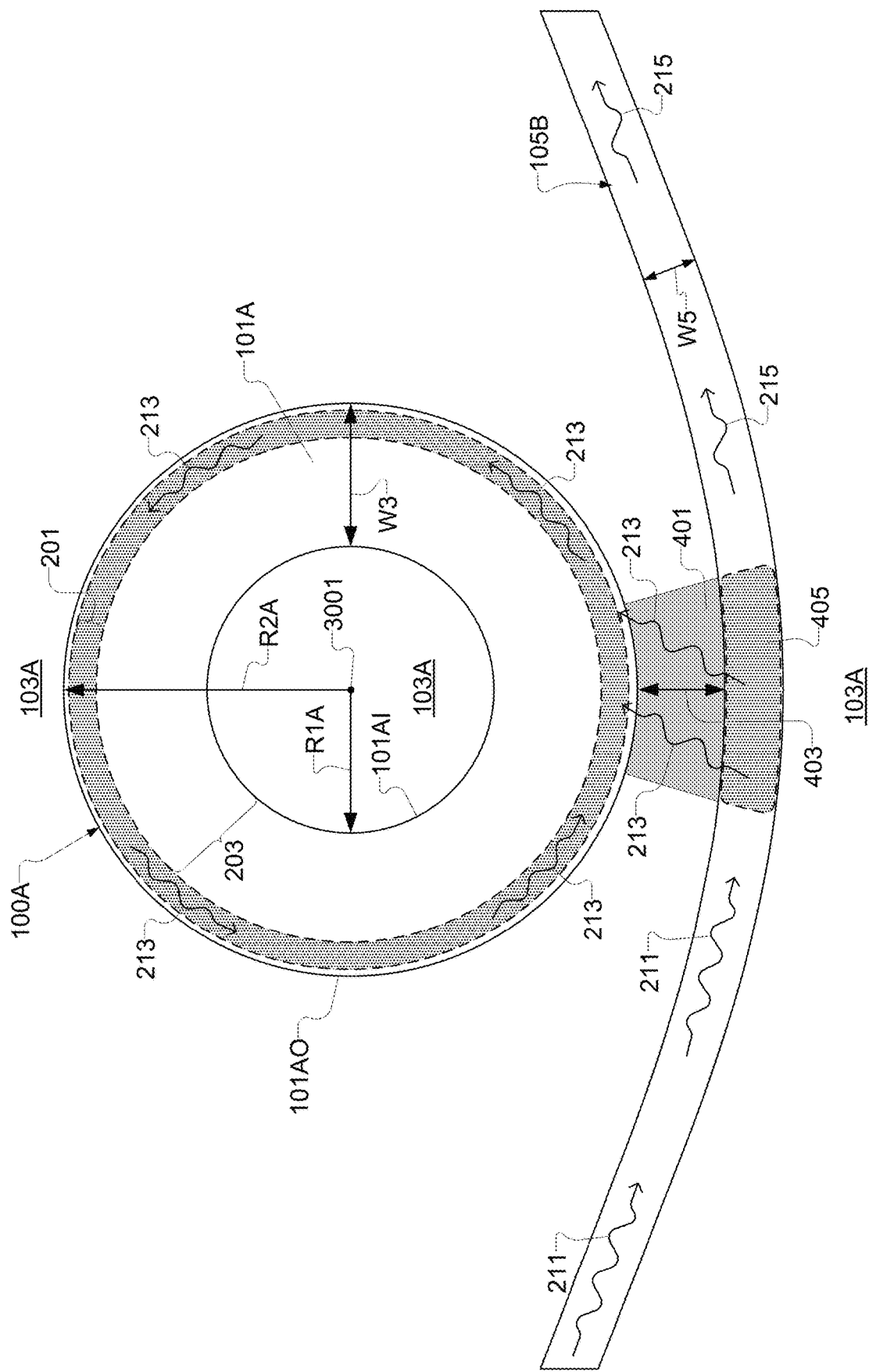
FIG. 4 shows a horizontal cross-section view of the ring resonator device positioned next to a tangentially approaching optical waveguide, in accordance with some embodiments of the present invention.

FIG. 4 shows a horizontal cross-section view of the ring resonator device 100A positioned next to a tangentially approaching optical waveguide 105B, in accordance with some embodiments of the present invention. The optical waveguide 105B is configured and positioned to extend past the outer wall surface 101AO of the passive optical cavity 101A of the ring resonator device 100A. The optical waveguide 105B has a width W5. The optical waveguide 105B follows a path toward the ring resonator device 100A such that a distance between the optical waveguide 105B and the outer surface 101AO of the passive optical cavity 101A gradually decreases to a minimum distance 403, then gradually increases again as the optical waveguide 105B follows a path away from the ring resonator device 100A. A light coupling region 401 exists between the optical waveguide 105B and the ring resonator device 100A along a coupling segment 405 of the optical waveguide 105B at which the distance between the optical waveguide 105B and the outer surface 101AO of the passive optical cavity 101A is sufficiently small to enable evanescently coupling of light from optical waveguide 105B through the light coupling region 401 into the passive optical cavity 101A. When light 211 that travels through the optical waveguide 105B toward the ring resonator device 100A reaches the coupling segment 405 of the optical waveguide 105B, a portion of light 213 will couple from optical waveguide 105B through the light coupling region 401 into the passive optical cavity 101A. In some embodiments, the light 213 that couples into the passive optical cavity 101A through the light coupling region 401 can be essentially all of the incoming light 211. In some embodiments, the light 213 that couples into the passive optical cavity 101A through the light coupling region 401 can be less than all of the incoming light 211, with an amount of uncoupled light 215 passing through the coupling segment 405 and propagating on within the optical waveguide 105B.

In some embodiments, the optical waveguide 105B is configured to take advantage of adiabatic coupling in order to reduce scattering loss in the optical waveguide 105B mode as the optical waveguide 105B approaches the ring resonator device 100A in the direction of propagation of the incoming light 211. Also, with the configuration of the optical waveguide 105B, as compared to the optical waveguide 105A of FIG. 2A, coupling of light between the optical waveguide 105B and the passive optical cavity 101A may be less sensitive to variations in as-fabricated conditions/parameters, including but not limited to one or more of dimensions of the optical waveguide 105B, dimensions of the passive optical cavity 101A, spacing between the optical waveguide 105A and the passive optical cavity 101A, refractive index of the optical waveguide 105B material, refractive index of the passive optical cavity 101A material, and refractive index of the cladding material 103A. Also, with the configuration of the optical waveguide 105B, as compared to the optical waveguide 105A of FIG. 2A, coupling of light between the optical waveguide 105B and the passive optical cavity 101A may be less sensitive to variations in the wavelength of the incoming light 211.

Figure 5:
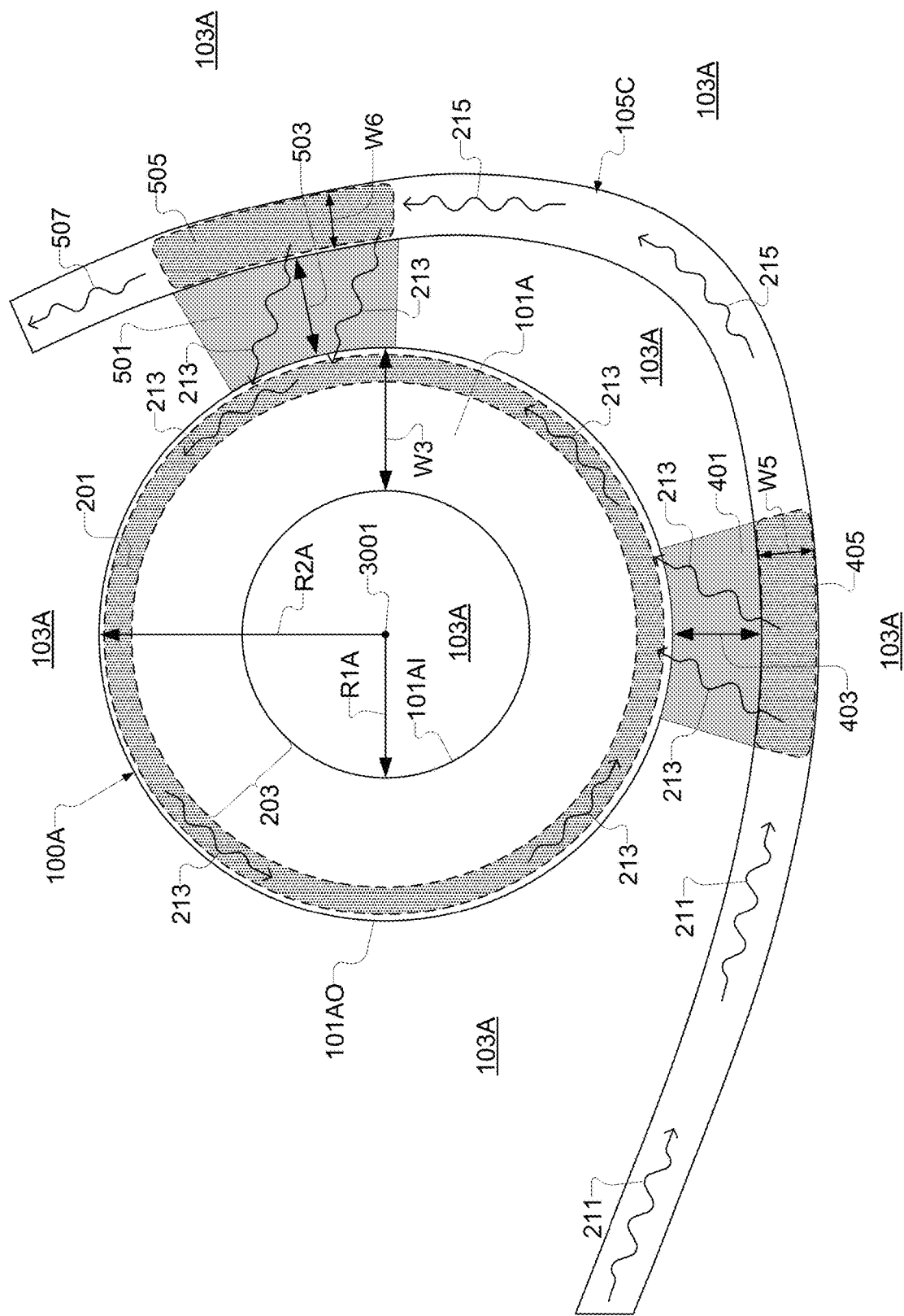
FIG. 5 shows a horizontal cross-section view of the ring resonator device positioned next to a multiple passing/coupling optical waveguide, in accordance with some embodiments of the present invention.

FIG. 5 shows a horizontal cross-section view of the ring resonator device 100A positioned next to a multiple passing/coupling optical waveguide 105C, in accordance with some embodiments of the present invention. The optical waveguide 105C is configured and positioned to extend past the outer wall surface 101AO of the passive optical cavity 101A of the ring resonator device 100A and approach the outer wall surface 101AO of the passive optical cavity 101A at multiple locations. The optical waveguide 105C has the width W5 at the first location of approach to the outer wall surface 101AO of the passive optical cavity 101A, and a width W6 at the second location of approach to the outer wall surface 101AO of the passive optical cavity 101A. In some embodiments, the width W5 and the width W6 are substantially equal. In some embodiments, the width W5 is different than the width W6.

The optical waveguide 105C follows a path toward the ring resonator device 100A at the first location of approach such that a distance between the optical waveguide 105C and the outer surface 101AO of the passive optical cavity 101A gradually decreases to the minimum distance 403, then gradually increases again as the optical waveguide 105C follows a path away from the ring resonator device 100A. Then, the optical waveguide 105C follows a path back toward the ring resonator device 100A at the second location of approach such that a distance between the optical waveguide 105C and the outer surface 101AO of the passive optical cavity 101A gradually decreases to the minimum distance 503, then gradually increases again as the optical waveguide 105C follows a path away from the ring resonator device 100A.

The light coupling region 401 exists between the optical waveguide 105C and the ring resonator device 100A along the coupling segment 405 of the optical waveguide 105C at which the distance between the optical waveguide 105C and the outer surface 101AO of the passive optical cavity 101A is sufficiently small to enable evanescently coupling of light from optical waveguide 105C through the light coupling region 401 into the passive optical cavity 101A. The light coupling region 501 exists between the optical waveguide 105C and the ring resonator device 100A along a coupling segment 505 of the optical waveguide 105C at which the distance between the optical waveguide 105C and the outer surface 101AO of the passive optical cavity 101A is sufficiently small to enable evanescently coupling of light from optical waveguide 105C through the light coupling region 501 into the passive optical cavity 101A.

When light 211 that travels through the optical waveguide 105C toward the ring resonator device 100A reaches the coupling segment 405 of the optical waveguide 105C, a portion of light 213 will couple from optical waveguide 105C through the light coupling region 401 into the passive optical cavity 101A. The light 213 that couples into the passive optical cavity 101A through the light coupling region 401 is less than all of the incoming light 211, with an amount of uncoupled light 215 passing through the coupling segment 405 and continuing on within the optical waveguide 105C. Then, when light 215 that travels through the optical waveguide 105C toward the ring resonator device 100A reaches the coupling segment 505 of the optical waveguide 105C, an additional portion of light 213 will couple from optical waveguide 105C through the light coupling region 501 into the passive optical cavity 101A. In some embodiments, the light 213 that couples into the passive optical cavity 101A through the light coupling region 501 is less than all of the light 215, with an amount of uncoupled light 507 passing through the coupling segment 505 and propagating on within the optical waveguide 105C. In some embodiments, all of the light 215 is coupled into the passive optical cavity 101A through the light coupling region 501.

In the example embodiment of FIG. 5, multiple distinct coupling regions exist so that light is coupled from the optical waveguide 105C into the ring resonator device 100A at separate locations around the passive optical cavity 101A. In such embodiments, interference between light coupled into the ring resonator device 100A from the separate locations around the passive optical cavity 101A may be tuned to manipulate characteristics of the ring resonator device 100A, such as the spectral spacing of longitudinal cavity modes (i.e., free spectral range) and resonance wavelength, among other characteristics.

A photonic system is disclosed herein that includes the passive optical cavity 101A/101B having a preferred radial mode (within the radial segment 201) for light propagation within the passive optical cavity 101A/101B. The preferred radial mode has a unique light propagation constant within the passive optical cavity 101A/101B (within the radial segment 201). The photonic system also includes an optical waveguide 105A/105B/105C configured to extend past the passive optical cavity 101A/101B, such that at least some light propagating through the optical waveguide 105A/105B/105C will evanescently couple into the passive optical cavity 101A/101B. The passive optical cavity 101A/101B and the optical waveguide 105A/105B/105C are collectively configured such that a light propagation constant of the optical waveguide 105A/105B/105C substantially matches the unique light propagation constant of the preferred radial mode within the passive optical cavity 101A/101B (within the radial segment 201).

The passive optical cavity 101A/101B includes a curved section 101A/301/303 having an outer wall 101AO/101BO defined by an outer radius R2A, an inner wall defined by an inner radius R1A, and a radial width W3 measured as the outer radius R2A minus the inner radius R1A. In some embodiments, the radial width W3 of the curved section 101A/301/303 of the passive optical cavity 101A/101B is within a range extending from about 4 micrometers to about 500 micrometers. In some embodiments, the radial width W3 of the curved section 101A/301/303 of the passive optical cavity 101A/101B is within a range extending from about 30 micrometers to about 60 micrometers. In some embodiments, the radial width W3 of the curved section 101A/301/303 of the passive optical cavity 101A/101B is large enough to support multiple radial modes of light propagation within the passive optical cavity 101A/101B, where the preferred radial mode is one of the multiple radial modes. In some embodiments, the preferred radial mode is a fundamental mode or a lowest order mode having a radius of maximum energy density closest to the outer wall 101AO/101BO relative to others of the multiple radial modes.

The optical waveguide 105A/105B/105C has a first wall, a second wall, and a width W4 measured perpendicularly between the first wall and the second wall, where the first wall is positioned closest to the passive optical cavity 101A/101B. In some embodiments, the radial width W3 of the curved section 101A/301/303 of the passive optical cavity 101A/101B is greater than or equal to two times the width W4 of the optical waveguide 105A/105B/105C. In some embodiments, the width W4 of the optical waveguide 105A/105B/105C is within a range extending from about 250 nanometers to about 650 nanometers.

The cladding material 103A is disposed/formed around and between the passive optical cavity 101A/101B and the optical waveguide 105A/105B/105C. The cladding material 103A has an optical refractive index different than each of an optical refractive index of the passive optical cavity 101A/101B and an optical refractive index of the optical waveguide 105A/105B/105C. In some embodiments, the radial width W3 of the curved section 101A/301/303 of the passive optical cavity 101A/101B is greater than $\lambda/\sqrt{n_{core}^2 - n_{clad}^2}$, wherein $\lambda$ is a wavelength of light corresponding to the preferred radial mode within the passive optical cavity 101A/101B, $n_{core}$ is the optical refractive index of the passive optical cavity 101A/101B, and $n_{clad}$ is the optical refractive index of the cladding material 103A. In some embodiments, the wavelength of light ($\lambda$) corresponding to the preferred radial mode within the passive optical cavity 101A/101B is within a range extending from about 1 micrometer to about 2 micrometers. In some embodiments, the wavelength of light ($\lambda$) corresponding to the preferred radial mode within the passive optical cavity 101A/101B is within a range extending from about 1260 nanometers to about 1310 nanometers.

In some embodiments, the optical waveguide 105A/105B/105C has a vertical thickness (d5A) as measured parallel to the first wall and the second wall within a range extending from about 30 nanometers to about 500 nanometers. In some embodiments, the vertical thickness (d5A) is within a range extending from about one-tenth of the width W4 of the optical waveguide 105A/105B/105C to about three times the width W4 of the optical waveguide 105A/105B/105C. In some embodiments, the passive optical cavity 101A/101B has a vertical thickness (d1A) as measured parallel to the outer wall of the curved section 101A/301/303 that is substantially equal to the vertical thickness (d5A) of the optical waveguide 105A/105B/105C.

In some embodiments, the first wall of the optical waveguide 105A has a curvature that substantially matches a curvature of the outer wall of the curved section 101A/301/303 of the passive optical cavity 101A/101B along an optical coupling region 207, when viewed in a horizontal cross-section oriented perpendicular to a centerline axis 3001 of the passive optical cavity 101A/101B. In some embodiments, the passive optical cavity 101A is annular shaped with the outer wall 101AO forming a circle within the horizontal cross-section, with the optical coupling region 207 extending around about one-tenth to about one-quarter of a circumference of the outer wall 101AO of the passive optical cavity 101A, or with the optical coupling region 207 extending around about one-fifth to about one-half of a circumference of the outer wall 101AO of the passive optical cavity 101A. In some embodiments, a distance 205/403/503 separating the outer wall 101AO of the curved section 101A/301/303 of the passive optical cavity 101A/101B from the first wall of the optical waveguide 105A/105B/105C along the optical coupling region 207/401/501, as measured in the horizontal cross-section substantially perpendicular to both the outer wall 101AO and the first wall of the optical waveguide 105A/105B/105C, is within a range extending from about 50 nanometers to about 1 micrometer, or within a range extending from about 250 nanometers to about 350 nanometers.

In some embodiments, the first wall of the optical waveguide 105B/105C has a curvature that tangentially approaches a curvature of the outer wall 101AO/101BO of the curved section 101A/301/303 of the passive optical cavity 101A/101B along an optical coupling region 401/501, when viewed in the horizontal cross-section oriented perpendicular to the centerline axis 3001 of the passive optical cavity 101A/101B, such that a minimum separation distance exists at a single location between the first wall of the optical waveguide 105B/105C and the outer wall 101AO/101BO of the curved section 101A/301/303 of the passive optical cavity 101A/101B. In some embodiments, the passive optical cavity 101A is annular shaped with the outer wall 101AO forming a circle within the horizontal cross-section, with the optical coupling region 401/501 extending around about one-tenth to about one-quarter of a circumference of the outer wall 101AO of the passive optical cavity 101A, or with the optical coupling region 401/501 extending around about one-fifth to about one-half of a circumference of the outer wall 101AO of the passive optical cavity 101A. In some embodiments, the minimum separation distance 403/503 between the outer wall of the curved section 101A/301/303 of the passive optical cavity 101A/101B and the first wall of the optical waveguide 105B/105C is within a range extending from about 50 nanometers to about 1 micrometer, or within a range extending from about 100 nanometers to about 350 nanometers.

In some embodiments, the passive optical cavity 101A is annular-shaped with the curved section 101A extending continuously around the passive optical cavity 101A. In some embodiments, the passive optical cavity 101B is race track shaped, and includes a first curved section 301 and a second curved section 303, and a two substantially parallel linear sections 305 and 307 connecting the first curved section 301 to the second curved section 303, such that the passive optical cavity 101B has a continuous circuitous configuration.

In some embodiments, the first wall of the optical waveguide 105C has a curvature that tangentially approaches a curvature of the outer wall 101AO of the passive optical cavity 101A at a first location along a first optical coupling region 401, when viewed in the horizontal cross-section oriented perpendicular to the centerline axis 3001 of the passive optical cavity 101A, such that a first minimum separation distance 403 exists at the first location between the first wall of the optical waveguide 105C and the outer wall 101AO of the passive optical cavity 101A. Also, in this embodiment, the curvature of the first wall of the optical waveguide 105C tangentially approaches the curvature of the outer wall 101AO of the passive optical cavity 101A at a second location along a second optical coupling region 501, when viewed in the horizontal cross-section, such that a second minimum separation distance 503 exists at the second location between the first wall of the optical waveguide 105C and the outer wall 101AO of the passive optical cavity 101A. Also, in this embodiment, the first optical coupling region 401 is separated from the second optical coupling region 501.

In some embodiments, the passive optical cavity 101A/101B and the optical waveguide 105A/105B/105C are formed of one or more of monocrystalline silicon, polycrystalline silicon, amorphous silicon, silica, glass, silicon nitride, silicon dioxide, germanium oxide, and III-V material. In some embodiments, the cladding material 103A disposed around and between the passive optical cavity 101A/101B and the optical waveguide 105A/105B/105C is formed of one or more of silicon dioxide and silicon nitride, so long as the cladding material 103A has an optical refractive index different than each of an optical refractive index of the passive optical cavity 101A/101B and an optical refractive index of the optical waveguide 105A/105B/105C.

Figure 6:
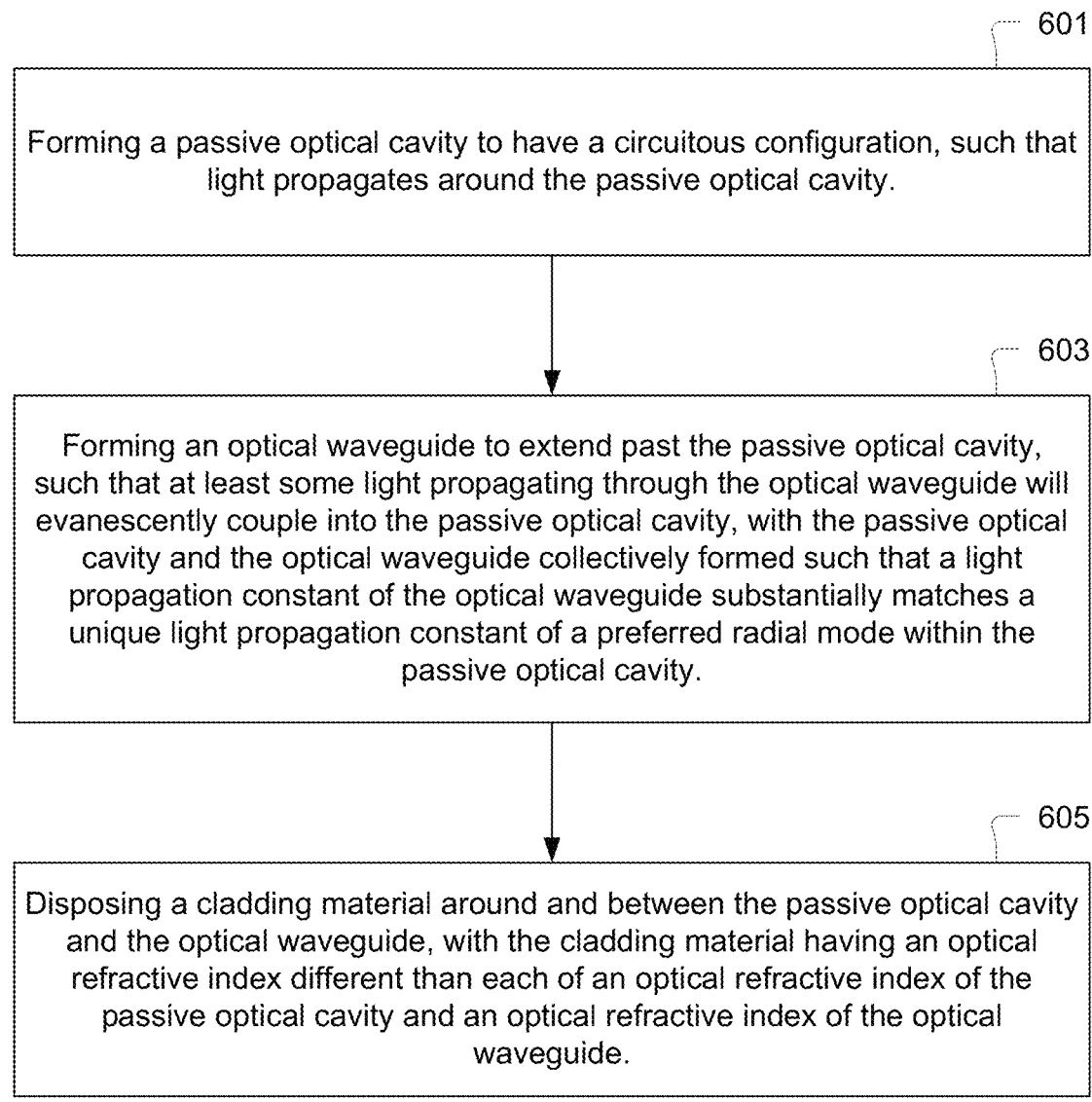
FIG. 6 shows a flowchart of a method for manufacturing a photonic system, in accordance with some embodiments of the present invention.

FIG. 6 shows a flowchart of a method for manufacturing a photonic system, in accordance with some embodiments of the present invention. The method includes an operation 601 for forming the passive optical cavity 101A/101B to have a circuitous configuration, such that light propagates around the passive optical cavity 101A/101B. The passive optical cavity 101A/101B is formed to have a preferred radial mode for light propagation within the passive optical cavity 101A/101B. The preferred radial mode has a unique light propagation constant within the passive optical cavity 101A/101B. The method also includes an operation 603 for forming the optical waveguide 105A/105B/105C to extend past the passive optical cavity 101A/101B, such that at least some light propagating through the optical waveguide 105A/105B/105C will evanescently couple into the passive optical cavity 101A/101B. The passive optical cavity 101A/101B and the optical waveguide 105A/105B/105C are collectively formed such that a light propagation constant of the optical waveguide 105A/105B/105C substantially matches the unique light propagation constant of the preferred radial mode within the passive optical cavity 101A/101B.

The passive optical cavity 101A/101B is formed to include the curved section 101A/301/303 having the outer wall 101AO/101BO defined by the outer radius R2A, the inner wall 101AI/101BI defined by the inner radius R1A, and the radial width W3 measured as the outer radius R2A minus the inner radius R1A. In some embodiments, the radial width W3 of the curved section 101A/301/303 of the passive optical cavity 101A/101B is formed large enough to support multiple radial modes of light propagation within the passive optical cavity 101A/101B, where the preferred radial mode is one of the multiple radial modes. In some embodiments, the preferred radial mode is the fundamental mode or the lowest order mode having a radius of maximum energy density closest to the outer wall 101AO/101BO relative to others of the multiple radial modes.

In some embodiments, the optical waveguide 105A/105B/105C is formed to have the first wall, the second wall, and the width W5 measured perpendicularly between the first wall and the second wall, where the first wall is positioned closest to the passive optical cavity 101A/101B. In some embodiments, the optical waveguide 105A/105B/105C is formed to have the vertical thickness (d5A) as measured parallel to the first wall and the second wall within the range extending from about one-tenth of the width W4 of the optical waveguide 105A/105B/105C to about three times the width W4 of the optical waveguide 105A/105B/105C. In some embodiments, the passive optical cavity 101A/101B is formed to have the vertical thickness (d1A) as measured parallel to the outer wall of the curved section 101A/301/303 that is substantially equal to the vertical thickness (d5A) of the optical waveguide 105A/105B/105C.

The method also includes an operation 605 for disposing the cladding material 103A around and between the passive optical cavity 101A/101B and the optical waveguide 105A/105B/105C. The cladding material 103A has an optical refractive index different than each of an optical refractive index of the passive optical cavity 101A/101B and an optical refractive index of the optical waveguide 105A/105B/105C.

In some embodiments, the operation 601 includes forming the passive optical cavity 101A/101B to have an annular shape with the curved section 101A extending continuously around the passive optical cavity 101A. In some embodiments, the operation 601 includes forming the passive optical cavity 101B to have the race track shape including the first curved section 301, the second curved section 303, and the two substantially parallel linear sections 305 and 307 connecting the first curved section 301 to the second curved section 303, such that the passive optical cavity 101B has a continuous circuitous configuration.

In some embodiments, the operation 603 includes forming the first wall of the optical waveguide 105A/105B/105C to have a curvature that substantially matches a curvature of the outer wall 101AO/101BO of the curved section 101A/301/303 of the passive optical cavity 101A/101B along the optical coupling region 207/401/501, when viewed in the horizontal cross-section oriented perpendicular to the centerline axis 3001 of the passive optical cavity 101A/101B. In some embodiments, the operation 603 includes forming the first wall of the optical waveguide 105A/105B/105C to have a curvature that tangentially approaches a curvature of the outer wall 101AO/101BO of the curved section 101A/301/303 of the passive optical cavity 101A/101B along an optical coupling region 207/401/501, when viewed in the horizontal cross-section oriented perpendicular to the centerline axis 3001 of the passive optical cavity 101A/101B, such that a minimum separation distance exists at a single location between the first wall of the optical waveguide 105A/105B/105C and the outer wall 101AO/101BO of the curved section 101A/301/303 of the passive optical cavity 101A/101B.

In some embodiments, the operation 603 includes forming the optical waveguide 105C to have the curvature that tangentially approaches the curvature of the outer wall 101AO of the passive optical cavity 101A at a first location along a first optical coupling region 401, when viewed in the horizontal cross-section oriented perpendicular to the centerline axis 3001 of the passive optical cavity 101A, such that the first minimum separation distance 403 exists at the first location between the first wall of the optical waveguide 105C and the outer wall 101AO of the passive optical cavity 101A. Also, in this embodiment, the operation 603 includes forming the curvature of the first wall of the optical waveguide 105C to tangentially approach the curvature of the outer wall 101AO of the passive optical cavity 101A at the second location along the second optical coupling region 501, when viewed in the horizontal cross-section, such that the second minimum separation distance 503 exists at the second location between the first wall of the optical waveguide 105C and the outer wall 101AO of the passive optical cavity 101A.

Optical ring resonator devices and optical disk resonator devices may be used in a variety of applications, such as optical data communications, biological sensing, chemical sensing, among others. A ring/disk resonator device is positioned next to an optical waveguide to enable coupling of light from the optical waveguide into the ring/disk resonator device and/or to enable coupling of light from the ring/disk resonator device into the optical waveguide. For a ring/disk resonator device that supports multiple radial optical modes in each polarization, it is often required to couple light into and out of only a single mode of the ring/disk resonator device. Various embodiments are disclosed herein for a ring/disk resonator device and associated optical waveguide system that enables efficient coupling of light from the optical waveguide into a preferred radial mode of the ring/disk resonator device, without appreciable coupling of light from the optical waveguide into non-preferred radial mode(s) of the ring/disk resonator device, and with low bend loss and high bandwidth.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

Although the foregoing invention has been described in some detail for purposes of clarity of understanding, it will be apparent that certain changes and modifications can be practiced within the scope of the invention description. Accordingly, the present embodiments are to be considered as illustrative and not restrictive, and the invention is not to be limited to the details given herein, but may be modified within the scope and equivalents of the described embodiments.

What is claimed is:

1. A photonic system, comprising:
a passive optical cavity having a preferred radial mode for light propagation within the passive optical cavity, the preferred radial mode having a unique light propagation constant within the passive optical cavity; and
an optical waveguide configured to extend past the passive optical cavity such that at least some light propagating through the optical waveguide will evanescently couple into the passive optical cavity, the passive optical cavity and the optical waveguide collectively configured such that a light propagation constant of the optical waveguide substantially matches the unique light propagation constant of the preferred radial mode within the passive optical cavity.

2. The photonic system as recited in claim 1, wherein the passive optical cavity includes a curved section having an outer wall defined by an outer radius, an inner wall defined by an inner radius, and a radial width measured as the outer radius minus the inner radius.

3. The photonic system as recited in claim 2, wherein the radial width of the curved section of the passive optical cavity is within a range extending from about 500 nanometers to about 3 micrometers.

4. The photonic system as recited in claim 2, wherein the radial width of the curved section of the passive optical cavity is large enough to support multiple radial modes of light propagation within the passive optical cavity, wherein the preferred radial mode is one of the multiple radial modes, and wherein the preferred radial mode is a fundamental mode or a lowest order mode having a radius of maximum energy density closest to the outer wall relative to others of the multiple radial modes.

5. The photonic system as recited in claim 2, wherein the optical waveguide has a first wall, a second wall, and a width measured perpendicularly between the first wall and the second wall, the first wall positioned closest to the passive optical cavity.

6. The photonic system as recited in claim 5, wherein the radial width of the curved section of the passive optical cavity is greater than or equal to two times the width of the optical waveguide.

7. The photonic system as recited in claim 6, wherein the width of the optical waveguide is within a range extending from about 250 nanometers to about 650 nanometers.

8. The photonic system as recited in claim 5, further comprising:
a cladding material disposed around and between the passive optical cavity and the optical waveguide, the cladding material having an optical refractive index different than each of an optical refractive index of the passive optical cavity and an optical refractive index of the optical waveguide.

9. The photonic system as recited in claim 8, wherein the radial width of the curved section of the passive optical cavity is greater than $\lambda/\sqrt{n_{core}^2-n_{clad}^2}$, wherein $\lambda$ is a free-space wavelength of light corresponding to the preferred radial mode within the passive optical cavity, $n_{core}$ is the optical refractive index of the passive optical cavity, and $n_{clad}$ is the optical refractive index of the cladding material.

10. The photonic system as recited in claim 9, wherein the wavelength of light corresponding to the preferred radial mode within the passive optical cavity is within a range extending from about 1260 nanometers to about 1310 nanometers.

11. The photonic system as recited in claim 5, wherein the optical waveguide has a vertical thickness as measured parallel to the first wall and the second wall within a range extending from about 30 nanometers to about 500 nanometers.

12. The photonic system as recited in claim 5, wherein the first wall of the optical waveguide has a curvature that substantially matches a curvature of the outer wall of the curved section of the passive optical cavity along an optical coupling region when viewed in a horizontal cross-section oriented perpendicular to a centerline axis of the passive optical cavity.

13. The photonic system as recited in claim 12, wherein the passive optical cavity is annular shaped with the outer wall forming a circle within the horizontal cross-section, the optical coupling region extending around about one-tenth to about one-quarter of a circumference of the outer wall of the passive optical cavity.

14. The photonic system as recited in claim 5, wherein the first wall of the optical waveguide has a curvature that tangentially approaches a curvature of the outer wall of the curved section of the passive optical cavity along an optical coupling region when viewed in a horizontal cross-section oriented perpendicular to a centerline axis of the passive optical cavity, such that a minimum separation distance exists at a single location between the first wall of the optical waveguide and the outer wall of the curved section of the passive optical cavity.

15. The photonic system as recited in claim 14, wherein the passive optical cavity is annular shaped with the outer wall forming a circle within the horizontal cross-section, the optical coupling region extending around about one-tenth to about one-quarter of a circumference of the outer wall of the passive optical cavity.

16. The photonic system as recited in claim 14, wherein the minimum separation distance between the outer wall of the curved section of the passive optical cavity and the first wall of the optical waveguide is within a range extending from about 100 nanometers to about 350 nanometers.

17. The photonic system as recited in claim 2, wherein the passive optical cavity is annular-shaped with the curved section extending continuously around the passive optical cavity.

18. The photonic system as recited in claim 1, wherein the passive optical cavity and the optical waveguide are formed of one or more of monocrystalline silicon, polycrystalline silicon, amorphous silicon, silica, glass, silicon nitride, silicon dioxide, germanium oxide, and III-V material.

19. The photonic system as recited in claim 18, further comprising:
a cladding material disposed around and between the passive optical cavity and the optical waveguide, wherein the cladding material is formed of one or more of silicon dioxide and silicon nitride, so long as the cladding material has an optical refractive index different than each of an optical refractive index of the passive optical cavity and an optical refractive index of the optical waveguide.

20. A photonic system, comprising:
a ring resonator having a passive optical cavity, the passive optical cavity having a circuitous configuration, the passive optical cavity having an outer wall, a top surface, and a bottom surface, the passive optical cavity having a curved portion, the outer wall of the curved portion having a first radius of curvature, the ring resonator configured to support multiple radial modes of light propagation within the passive optical cavity, the passive optical cavity having a preferred radial segment through which a preferred radial mode of light propagates within the passive optical cavity, the preferred radial segment having a first light propagation constant; and
an optical waveguide configured to extend past the passive optical cavity of the ring resonator, the optical waveguide having an outer wall farthest from the passive optical cavity of the ring resonator, the optical waveguide having an inner wall closest to the passive optical cavity of the ring resonator, the optical waveguide having a top surface and a bottom surface, the optical waveguide having a substantially constant width as measured substantially perpendicularly between the inner wall and the outer wall of the optical waveguide, the optical waveguide having a curved portion that is proximate to the curved portion of the passive optical cavity of the ring resonator, the curved portion of the optical waveguide having a second radius of curvature such that the curved portion of the optical waveguide curves around the curved portion of the passive optical cavity of the ring resonator, the optical waveguide having a second light propagation constant, the optical waveguide and the passive optical cavity of the ring resonator collectively configured so that the second light propagation constant of the optical waveguide is substantially equal to the first light propagation constant of the preferred radial segment of the passive optical cavity of the ring resonator.

21. A photonic system, comprising:
a passive optical cavity having an annular shape, the passive optical cavity having an outer wall defined by an outer radius and an inner wall defined by an inner radius, the passive optical cavity having a substantially constant width measured substantially perpendicularly between the inner wall and the outer wall of the passive optical cavity, the passive optical cavity having a preferred radial segment through which a preferred radial mode of light propagates within the passive optical cavity, the preferred radial segment having a first light propagation constant; and
an optical waveguide having a first wall and a second wall, the optical cavity having a width measured substantially perpendicularly between the first wall and the second wall, the optical waveguide having a curved portion configured to curve around a portion of the passive optical cavity, the optical waveguide positioned relative to the passive optical cavity such that a coupling gap distance exists between at least some location along the curved portion of the optical waveguide and the outer wall of the passive optical cavity, the optical waveguide having a second light propagation constant, the optical waveguide and the passive optical cavity collectively configured so that the second light propagation constant of the optical waveguide is substantially equal to the first light propagation constant of the preferred radial segment of the passive optical cavity.

* * * * *